United States Patent
Bruggemann et al.

(10) Patent No.: US 9,983,584 B2
(45) Date of Patent: May 29, 2018

(54) METHOD AND APPARATUS FOR DEVELOPING A FLIGHT PATH

(71) Applicant: SPATIAL INFORMATION SYSTEMS RESEARCH LIMITED, Carlton, Victoria (AU)

(72) Inventors: Troy Bruggemann, Queensland (AU); Jason Ford, Queensland (AU)

(73) Assignee: SPATIAL INFORMATION SYSTEMS RESEARCH LIMITED, Victoria (AU)

( * ) Notice: Subject to any disclaimer, the term of this patent is extended or adjusted under 35 U.S.C. 154(b) by 0 days. days.

(21) Appl. No.: 15/038,026

(22) PCT Filed: Nov. 20, 2014

(86) PCT No.: PCT/AU2014/050360
§ 371 (c)(1),
(2) Date: May 19, 2016

(87) PCT Pub. No.: WO2015/081383
PCT Pub. Date: Jun. 11, 2015

(65) Prior Publication Data
US 2016/0299506 A1    Oct. 13, 2016

(30) Foreign Application Priority Data

Dec. 4, 2013   (AU) ............................... 2013904709
Jun. 12, 2014  (AU) ............................... 2014902240

(51) Int. Cl.
*G05D 1/00* (2006.01)
*G01C 7/02* (2006.01)
(Continued)

(52) U.S. Cl.
CPC ........... *G05D 1/0094* (2013.01); *B64D 31/06* (2013.01); *G01C 5/005* (2013.01); *G01C 7/02* (2013.01);
(Continued)

(58) Field of Classification Search
CPC .... G05D 1/0094; G05D 1/044; G05D 1/0607; G05D 1/0808; G05D 1/101; B64D 31/06;
(Continued)

(56) References Cited

U.S. PATENT DOCUMENTS 5,894,323 A * 4/1999 Kain ................. G01C 11/02
348/116
6,281,970 B1 * 8/2001 Williams ............... G01C 21/00
250/334

(Continued)

FOREIGN PATENT DOCUMENTS

WO    2009093276 A1    7/2009

OTHER PUBLICATIONS

Kendoul, "Survey of Advances in Guidance, Navigation and Control of Unmanned Rotorcraft Systems", Journal of Field Robotics, Jan. 18, 2012, vol. 29, Issue 2, pp. 315-378 [online], [retrieved on Jan. 22, 2015]. Retrieved from the Internet <URL: http://www.ict.csiro.au/staff/farid.kendoul/JFR-2012.pdf>.

(Continued)

*Primary Examiner* — Gertrude Arthur Jeanglaude
(74) *Attorney, Agent, or Firm* — Arent Fox LLP

(57) ABSTRACT

A method of developing a flight path for precision flying over an area of interest, the method including, in an electronic processing device, determining coordinate and elevation data relating to an area of interest, using the coordinate and elevation data to determine a flight path including precision paths corresponding to precision flying trajectories and non-precision paths interconnecting at least some of the (Continued)

precision paths, and generating path data at least partially indicative of the flight path, the path data being useable in generating control signals for at least partially controlling operation of the aircraft, in use.

19 Claims, 12 Drawing Sheets

(51) Int. Cl.
| | |
|---|---|
| *G01C 15/02* | (2006.01) |
| *G01S 17/89* | (2006.01) |
| *B64D 31/06* | (2006.01) |
| *G01C 5/00* | (2006.01) |
| *G01C 23/00* | (2006.01) |
| *G05D 1/04* | (2006.01) |
| *G05D 1/06* | (2006.01) |
| *G05D 1/08* | (2006.01) |
| *G05D 1/10* | (2006.01) |

(52) U.S. Cl.
CPC ........... *G01C 15/02* (2013.01); *G01C 23/005* (2013.01); *G01S 17/89* (2013.01); *G05D 1/044* (2013.01); *G05D 1/0607* (2013.01); *G05D 1/0808* (2013.01); *G05D 1/101* (2013.01)

(58) Field of Classification Search
CPC .......... G01C 5/005; G01C 7/02; G01C 15/02; G01C 23/005; G01S 17/89
USPC ...................... 701/3, 5, 6, 13–16; 244/175 R
See application file for complete search history.

(56) References Cited

U.S. PATENT DOCUMENTS 7,597,489 B2 * 10/2009 Horak .................. G01J 5/08
250/347
2010/0286859 A1 11/2010 Feigh et al.

OTHER PUBLICATIONS

International Search Report in related Application No. PCT/AU2014/050360 dated Jan. 27, 2015.
Written Opinion in related Application No. PCT/AU2014/050360 dated Jan. 27, 2015.
International Preliminary Report on Patentability in related Application No. PCT/AU2014/050360 dated Jun. 7, 2016.
Bruggemann, Troy S., Ford, Jason J., and Walker, Rodney A., "Control of Aircraft for Inspection of Linear Infrastructure," IEEE Transactions on Control Systems Technology, vol. 19, No. 6, Nov. 2011.
Kok, Jonathan, Bruggemann, Troy S., & Gonzalez, Luis F., "An Evolutionary Computation Approach to Three-Dimensional Path Planning for Unmanned Aerial Vehicles with Tactical and Kinematic Constraints," http://eprints.qut.edu.au/57038/ Australian International Aerospace Congress, 2013, retrieved Jul. 11, 2017.
Techakesari, Onvaree, Bruggemann, Troy S., and Ford, Jason J., "Control of Infrastructure Inspection Aircraft Vertical Dynamics in the Presence of Thermal Disturbances," 2013 Australian Control Conference, Nov. 4-5, 2013.

* cited by examiner

METHOD AND APPARATUS FOR DEVELOPING A FLIGHT PATH

CROSS-REFERENCE TO RELATED APPLICATIONS

This application is a 371 application of International Application No. PCT/AU2014/050360 entitled "METHOD AND APPARATUS FOR DEVELOPING A FLIGHT PATH," filed Nov. 20, 2014, which claims priority to Foreign Application Nos. AU 2014902240 filed Jun. 12, 2014 and AU 2013904709 filed Dec. 4, 2013, the contents of each of the aforementioned applications being incorporated by reference as if fully set forth herein.

BACKGROUND OF THE INVENTION

The present invention relates to a method and apparatus for developing a flight path and a method and apparatus for controlling an aircraft, particularly for use in sensing or deployment within an area of interest, for example for infrastructure surveying.

DESCRIPTION OF THE PRIOR ART

The reference in this specification to any prior publication (or information derived from it), or to any matter which is known, is not, and should not be taken as an acknowledgment or admission or any form of suggestion that the prior publication (or information derived from it) or known matter forms part of the common general knowledge in the field of endeavour to which this specification relates.

Surveying of infrastructure, such as roads, powerlines, pipelines, or the like is problematic as such infrastructure can extend over long distances and often has limited accessibility. Consequently, these are often not suitable for manual ground based inspection methods. Whilst crawling robots have been proposed for inspecting linear infrastructure, these are typically slow and therefore unsuitable for use in inspecting large linear infrastructure networks, such as powerline networks, which include over 150,000 km of power lines in Queensland alone.

Consequently, current best practice is to perform aerial surveying using an aircraft equipped with a suitable sensor, such as LiDAR (Light Detection and Ranging) technology, in a process known as ALSM (Airborne Laser Swath Mapping). However, this also suffers from a number of drawbacks.

The complex and distributed nature of network infrastructure typically requires manual generation of flight plans, which are labour intensive to generate and have a high degree of variability depending on the preferences and experience of the person doing the planning. For example, the planning for small sections of network (<1500 km) often takes longer to develop than the actual flight time required for network capture.

Additionally, such manual methods also do not lend themselves to assessment of overall flight path lengths or capture of network spurs, meaning the resulting flight paths are often extremely inefficient. The planning process also gives little consideration to the sensor operational parameters relative to aircraft roll angle, meaning it is often not feasible to capture infrastructure for some planned flight paths. The planned paths must be flown manually, which coupled with a lack of feedback from sensors, means that pilots must maintain the position of the aircraft to ensure that the infrastructure remains in the sensor capture footprint, resulting in variable and inefficient implementation, problems with pilot fatigue and major safety issues.

In an attempt to address some of these issues, a system has been developed for generating 2D off-survey flight paths between manually defined on-survey flight paths. The system also allows for limited control of aircraft position in a 2D plane using existing commercial autopilots. However, the ability of this system is limited as it does not consider altitude, pitch or speed control, surrounding terrain, or no-fly regions, such as weather obstacles, or the like. Consequently not all developed flight paths can be flown, and it is still necessary for pilots to control the altitude of the aircraft, which while assisting, does not completely mitigate the extreme burden on the pilot.

Another key limitation of the approach is the necessity to perform manual survey path planning and flight line extraction, which results in inefficiencies in flight planning processes, and in particular does not allow for optimisation of both on and off-survey paths collectively, resulting in efficient flight paths and compromising of inspection objectives.

Similarly, precision flying can be required in other situations, such as during sensing or deployment in an area of interest.

SUMMARY OF THE PRESENT INVENTION

The present invention seeks to substantially overcome, or at least ameliorate, one or more disadvantages of existing arrangements.

In one broad form the invention seeks to provide a method of developing a flight path for precision flying over an area of interest, the method including, in an electronic processing device:
 a) determining coordinate and elevation data relating to an area of interest;
 b) using the coordinate and elevation data to determine a flight path including:
  i) precision paths corresponding to precision flying trajectories; and,
  ii) non-precision paths interconnecting at least some of the precision paths; and,
 c) generating path data at least partially indicative of the flight path, the path data being useable in generating control signals for at least partially controlling operation of the aircraft, in use.

Typically the precision paths are for at least one of:
 a) sensing at least part of the area of interest; and,
 b) deployment into the area of interest.

Typically the method includes controlling the attitude of the aircraft on the precision paths.

Typically the method includes, in the electronic processing device, determining the flight path at least in part using an aircraft flight path model and at least one of sensor coverage and deployment parameters.

Typically the method includes, in the electronic processing device:
 a) determining a plurality of candidate precision path sets;
 b) for each candidate precision path set, determining a candidate flight path; and,
 c) selecting a best candidate flight path from the candidate flight paths.

Typically the method includes, in the electronic processing device, for each candidate precision path set:
 a) determining non-precision paths between pairs of precision paths;

b) for each possible sequence of precision paths, calculating a length of a possible flight path; and, c) selecting the possible flight path with the shortest flight path length as the candidate flight path.

Typically the method includes, in the electronic processing device determining candidate non-precision paths using an aircraft flight path model.

Typically the method includes, in the electronic processing device, using the aircraft flight path model to calculate a candidate non-precision path using at least one of:

a) aircraft heading rate constraint and speed;
b) an aircraft maximum bank angle;
c) an aircraft minimum turn radius;
d) a required minimum altitude above the area of interest;
e) flight path angle; and
f) rate of climb speed of the aircraft.

Typically the method includes, in the electronic processing device:

a) determining a score for each candidate flight path; and,
b) selecting the best candidate flight path using the score.

Typically the method includes, in the electronic process device, determining the score in accordance with at least one of:

a) intersections with terrain using the elevation data;
b) intersections with no-fly zones using no-fly zone data indicative of the no-fly zones;
c) at least one of sensor coverage and deployment parameters; and,
d) a flight path length.

Typically the method includes, in the electronic processing device:

a) iteratively determining a plurality of best candidate flight paths; and,
b) selecting one of the plurality of best candidate flight paths as a best flight path.

Typically the method includes, in the electronic processing device, modifying the candidate precision path sets for each iteration.

Typically the method includes, in the electronic processing device, for each iteration:

a) comparing a best candidate flight path to a current best flight path; and,
b) selectively updating the current best flight path with the best candidate flight path depending on the results of the comparison.

Typically the method includes, in the electronic processing device, iteratively determining best candidate flight paths until at least one of:

a) a defined number of iterations have been performed; and,
b) a defined tolerance is reached.

Typically the path data includes:

a) precision segment data indicative of precision paths; and,
b) an precision path sequence indicative of an order in which precision paths should be flown.

Typically the path data is used in controlling at least one of a pitch and altitude of the aircraft in use.

Typically the path data is used in controlling at least one of a roll, yaw, airspeed and engine power of the aircraft in use.

Typically the path data is used in controlling at least one of a sensor and a deployment device.

Typically the method includes, in the electronic processing device:

a) determining a current aircraft position; and, b) calculating the flight path based on the current aircraft position.

In one broad form the invention seeks to provide apparatus for developing a flight path for precision flying over an area of interest, the apparatus including an electronic processing device that:

a) determines coordinate and elevation data relating to an area of interest;
b) uses the coordinate and elevation data to determine a flight path including:
   i) precision paths corresponding to precision flying trajectories; and,
   ii) non-precision paths interconnecting at least some of the precision paths; and,
c) generates path data at least partially indicative of the flight path, the path data being useable in generating control signals for at least partially controlling operation of the aircraft, in use.

In one broad form the invention seeks to provide a method of controlling an aircraft for precision flying over an area of interest, the method including, in an electronic processing device:

a) determining path data at least partially indicative of a flight path, the flight path including precision paths corresponding to precision flying trajectories and non-precision paths interconnecting at least some of the precision paths; and,
b) generating control signals for at least partially controlling at least one of the attitude, roll, pitch, speed and altitude of the aircraft using the path data.

Typically the method includes, in the electronic processing device:

a) determining coordinate and elevation data relating to an area of interest;
b) using the coordinate and elevation data to determine a flight path including:
   i) precision paths corresponding to precision flying trajectories; and,
   ii) non-precision paths interconnecting at least some of the precision paths; and,
c) generates path data at least partially indicative of the flight path, the path data being useable in generating control signals for at least partially controlling operation of the aircraft, in use.

Typically the path data includes:

a) precision segment data indicative of precision paths; and,
b) an precision path sequence indicative of an order in which precision paths should be flown.

Typically the method includes, in the electronic processing device:

a) determining from the precision segment data, the precision paths; and,
b) generating non-precision paths using an aircraft flight path model.

Typically the method includes, in the electronic processing device:

a) determining a current aircraft position;
b) determining a flight path segment in accordance with the current aircraft position; and,
c) generating control signals for at least partially controlling the aircraft using the flight path segment.

Typically the method includes, in the electronic processing device:

a) determining a current precision path using the current aircraft position;

b) determining at least one next precision path from the path data; and, c) determining a non-precision path using the current and next precision paths.

Typically the method includes, in the electronic processing device, providing the control signals to an automated flight control system, thereby allowing the automated flight control system to control the aircraft at least partially in accordance with the control signals.

Typically the method includes, in the automated flight control system, controlling the aircraft in accordance with control signals and user input commands.

Typically the path data is used in controlling at least one of a roll, yaw, speed and engine power of the aircraft in use.

Typically the method includes, in the electronic processing device:

a) determining if the aircraft is on an precision path; and, b) selectively activating and deactivating at least one of a sensor and deployment device depending on results of the comparison.

Typically the method includes, in the electronic processing device:

a) monitoring the sensor;

b) determining if the area of interest has been sensed; and, c) if not, modifying the flight path.

In one broad form the invention seeks to provide apparatus for controlling an aircraft for precision flying over an area of interest, the apparatus including an electronic processing device that:

a) determines path data at least partially indicative of a flight path, the flight path including precision paths corresponding to precision flying trajectories and non-precision paths interconnecting at least some of the precision paths; and, b) generates control signals for at least partially controlling at least one of the attitude, roll, pitch, speed and altitude of the aircraft using the path data.

In one broad form the invention seeks to provide a method of developing a flight path for precision flying over an area of interest, the method including, in an electronic processing device:

a) determining a flight path by optimising a combination of precision paths corresponding to precision flying trajectories and non-precision paths interconnecting at least some of the precision paths; and, b) generating path data at least partially indicative of the flight path, the path data being useable in generating control signals for at least partially controlling operation of the aircraft, in use.

Typically the method includes, in the electronic processing device:

a) determining a plurality of candidate precision path sets;

b) for each candidate precision path set, determining a candidate flight path; and, c) selecting a best candidate flight path from the candidate flight paths.

Typically the method includes, in the electronic processing device, for each candidate precision path set:

a) determining non-precision paths between pairs of precision paths;

b) for each possible sequence of precision paths, calculating a length of a possible flight path; and, c) selecting the possible flight path with the shortest flight path length as the candidate flight path.

Typically the method includes, in the electronic processing device determining candidate non-precision paths using an aircraft flight path model.

Typically the method includes, in the electronic processing device, using the aircraft flight path model by calculating a candidate non-precision path using at least one of:

a) aircraft heading rate constraint and speed;

b) an aircraft maximum bank angle;

c) an aircraft minimum turn radius;

d) a required minimum altitude above the area of interest;

e) flight path angle; and f) rate of climb speed of the aircraft.

Typically the method includes, in the electronic processing device:

a) determining a score for each candidate flight path; and, b) selecting the best candidate flight path using the score.

Typically the method includes, in the electronic process device, determining the score in accordance with at least one of:

a) intersections with terrain using the elevation data;

b) intersections with no-fly zones using no-fly zone data indicative of the no-fly zones;

c) at least one of sensor coverage and deployment parameters; and, d) a flight path length.

Typically the method includes, in the electronic processing device:

a) iteratively determining a plurality of best candidate flight paths; and, b) selecting one of the plurality of best candidate flight paths as a best flight path.

Typically the method includes, in the electronic processing device, modifying the candidate precision path sets for each iteration.

Typically the method includes, in the electronic processing device, for each iteration:

a) comparing a best candidate flight path to a current best flight path; and, b) selectively updating the current best flight path with the best candidate flight path depending on the results of the comparison.

Typically the method includes, in the electronic processing device, iteratively determining best candidate flight paths until at least one of:

a) a defined number of iterations have been performed; and, b) a defined tolerance is reached.

In one broad form the invention seeks to provide apparatus for developing a flight path for precision flying over an area of interest, the apparatus including an electronic processing device that:

a) determines a flight path by optimising a combination of precision paths corresponding to precision flying trajectories and non-precision paths interconnecting at least some of the precision paths; and, b) generates path data at least partially indicative of the flight path, the path data being useable in generating control signals for at least partially controlling operation of the aircraft, in use.

In one broad form the invention seeks to provide a method of developing a flight path for infrastructure surveying by an aircraft, the method including, in an electronic processing device:

a) determining coordinate and elevation data relating to infrastructure to be surveyed;

b) using the coordinate and elevation data to determine a flight path including:

i) on-survey paths corresponding to infrastructure segments; and, ii) off-survey paths interconnecting at least some of the on-survey paths; and, c) generating path data at least partially indicative of the flight path, the path data being useable in generating control signals for at least partially controlling operation of the aircraft, in use.

Typically the method includes, in the electronic processing device:
a) identifying infrastructure segments from the coordinate data;
b) grouping the infrastructure segments; and,
c) determining a flight path for each group of infrastructure segments.

Typically the method includes grouping the infrastructure segments in accordance with at least one of a flight time and flight distance requirement.

Typically the method includes, in the electronic processing device, determining the flight path at least in part using an aircraft flight path model and sensor coverage parameters.

Typically the method includes, in the electronic processing device:
a) determining a plurality of candidate on-survey path sets;
b) for each candidate on-survey path set, determining a candidate flight path; and,
c) selecting a best candidate flight path from the candidate flight paths.

Typically the method includes, in the electronic processing device, for each candidate on-survey path set:
a) determining off-survey paths between pairs of on-survey paths;
b) for each possible sequence of on-survey paths, calculating a length of a possible flight path; and,
c) selecting the possible flight path with the shortest flight path length as the candidate flight path.

Typically the method includes, in the electronic processing device determining candidate off-survey paths using an aircraft flight path model.

Typically the method includes, in the electronic processing device, using the aircraft flight path model to calculate a candidate off-survey path using at least one of:
a) aircraft heading rate constraint and speed;
b) an aircraft maximum bank angle;
c) an aircraft minimum turn radius;
d) a required minimum altitude above terrain and infrastructure;
e) flight path angle; and
f) rate of climb speed of the aircraft.

Typically the method includes, in the electronic processing device:
a) determining a score for each candidate flight path; and,
b) selecting the best candidate flight path using the score.

Typically the method includes, in the electronic process device, determining the score in accordance with at least one of:
a) intersections with terrain using the elevation data;
b) intersections with no-fly zones using no-fly zone data indicative of the no-fly zones;
c) infrastructure sensor coverage; and,
d) a flight path length.

Typically the method includes, in the electronic processing device:
a) iteratively determining a plurality of best candidate flight paths; and,
b) selecting one of the plurality of best candidate flight paths as a best flight path.

Typically the method includes, in the electronic processing device, modifying the candidate on-survey path sets for each iteration.

Typically the method includes, in the electronic processing device, for each iteration:
a) comparing a best candidate flight path to a current best flight path; and,
b) selectively updating the current best flight path with the best candidate flight path depending on the results of the comparison.

Typically the method includes, in the electronic processing device, iteratively determining best candidate flight paths until at least one of:
a) a defined number of iterations have been performed; and,
b) a defined tolerance is reached.

Typically the path data includes:
a) on-survey segment data indicative of on-survey paths; and,
b) an on-survey path sequence indicative of an order in which on-survey paths should be flown.

Typically the path data is used in controlling at least one of a pitch and altitude of the aircraft in use.

Typically the path data is used in controlling at least one of a roll, yaw, airspeed and engine power of the aircraft in use.

Typically the path data is used in controlling a sensor for sensing the infrastructure.

Typically the method includes, in the electronic processing device:
a) determining a current aircraft position; and,
b) calculating the flight path based on the current aircraft position.

In one broad form the invention seeks to provide apparatus for developing a flight path for infrastructure surveying by an aircraft, the apparatus including an electronic processing device that:
a) determines coordinate and elevation data relating to infrastructure to be surveyed;
b) uses the coordinate and elevation data to determine a flight path including:
i) on-survey paths corresponding to infrastructure segments; and,
ii) off-survey paths interconnecting at least some of the on-survey paths; and,
c) generates path data at least partially indicative of the flight path, the path data being useable in generating control signals for at least partially controlling operation of the aircraft, in use.

In one broad form the invention seeks to provide a method of controlling an aircraft for infrastructure surveying, the method including, in an electronic processing device:
a) determining path data at least partially indicative of a flight path, the flight path including on-survey paths corresponding to infrastructure segments and off-survey paths interconnecting at least some of the on-survey paths; and,
b) generating control signals for at least partially controlling at least one of the pitch, speed and altitude of the aircraft using the path data.

Typically the method includes, in the electronic processing device:
a) determining coordinate and elevation data relating to infrastructure to be surveyed;
b) using the coordinate and elevation data to determine a flight path including:

i) on-survey paths corresponding to infrastructure segments; and,
  ii) off-survey paths interconnecting at least some of the on-survey paths; and,
  c) generating path data at least partially indicative of the flight path, the path data being useable in generating control signals for at least partially controlling operation of the aircraft, in use.

Typically the path data includes:
  a) on-survey segment data indicative of on-survey paths; and,
  b) an on-survey path sequence indicative of an order in which on-survey paths should be flown.

Typically the method includes, in the electronic processing device:
  a) determining from the on-survey segment data, the on-survey paths; and,
  b) generating off-survey paths using an aircraft flight path model.

Typically the method includes, in the electronic processing device:
  a) determining a current aircraft position;
  b) determining a flight path segment in accordance with the current aircraft position; and,
  c) generating control signals for at least partially controlling the aircraft using the flight path segment.

Typically the method includes, in the electronic processing device:
  a) determining a current on-survey path using the current aircraft position;
  b) determining at least one next on-survey path from the path data; and,
  c) determining an off-survey path using the current and next on-survey paths.

Typically the method includes, in the electronic processing device, providing the control signals to an automated flight control system, thereby allowing the automated flight control system to control the aircraft at least partially in accordance with the control signals.

Typically the method includes, in the automated flight control system, controlling the aircraft in accordance with control signals and user input commands.

Typically the path data is used in controlling at least one of a roll, yaw, speed and engine power of the aircraft in use.

Typically the method includes, in the electronic processing device:
  a) determining if the aircraft is on an on-survey path; and,
  b) selectively activating and deactivating a sensor depending on results of the comparison.

Typically the method includes, in the electronic processing device:
  a) monitoring the sensor;
  b) determining if the infrastructure has been sensed; and,
  c) if not, modifying the flight path.

In one broad form the invention seeks to provide apparatus for controlling an aircraft for infrastructure surveying, the apparatus including an electronic processing device that:
  a) determines path data at least partially indicative of a flight path, the flight path including on-survey paths corresponding to infrastructure segments and off-survey paths interconnecting at least some of the on-survey paths; and,
  b) generates control signals for at least partially controlling at least one of the pitch, speed and altitude of the aircraft using the path data.

In one broad form the invention seeks to provide a method of developing a flight path for infrastructure surveying by an aircraft, the method including, in an electronic processing device:
  a) determining a flight path by optimising a combination of on-survey paths corresponding to infrastructure segments and off-survey paths interconnecting at least some of the on-survey paths; and,
  b) generating path data at least partially indicative of the flight path, the path data being useable in generating control signals for at least partially controlling operation of the aircraft, in use.

Typically the method includes, in the electronic processing device:
  a) determining a plurality of candidate on-survey path sets;
  b) for each candidate on-survey path set, determining a candidate flight path; and,
  c) selecting a best candidate flight path from the candidate flight paths.

Typically the method includes, in the electronic processing device, for each candidate on-survey path set:
  a) determining off-survey paths between pairs of on-survey paths;
  b) for each possible sequence of on-survey paths, calculating a length of a possible flight path; and,
  c) selecting the possible flight path with the shortest flight path length as the candidate flight path.

Typically the method includes, in the electronic processing device determining candidate off-survey paths using an aircraft flight path model.

Typically the method includes, in the electronic processing device, using the aircraft flight path model by calculating a candidate off-survey path using at least one of:
  a) aircraft heading rate constraint and speed;
  b) an aircraft maximum bank angle;
  c) an aircraft minimum turn radius;
  d) a required minimum altitude above terrain and infrastructure;
  e) flight path angle; and
  f) rate of climb speed of the aircraft.

Typically the method includes, in the electronic processing device:
  a) determining a score for each candidate flight path; and,
  b) selecting the best candidate flight path using the score.

Typically the method includes, in the electronic process device, determining the score in accordance with at least one of:
  a) intersections with terrain using the elevation data;
  b) intersections with no-fly zones using no-fly zone data indicative of the no-fly zones;
  c) infrastructure sensor coverage; and,
  d) a flight path length.

Typically the method includes, in the electronic processing device:
  a) iteratively determining a plurality of best candidate flight paths; and,
  b) selecting one of the plurality of best candidate flight paths as a best flight path.

Typically the method includes, in the electronic processing device, modifying the candidate on-survey path sets for each iteration.

Typically the method includes, in the electronic processing device, for each iteration:
  a) comparing a best candidate flight path to a current best flight path; and, b) selectively updating the current best flight path with the best candidate flight path depending on the results of the comparison.

Typically the method includes, in the electronic processing device, iteratively determining best candidate flight paths until at least one of:
  a) a defined number of iterations have been performed; and,
  b) a defined tolerance is reached.

In one broad form the invention seeks to provide apparatus for developing a flight path for infrastructure surveying by an aircraft, the apparatus including an electronic processing device that:
  a) determines a flight path by optimising a combination of on-survey paths corresponding to infrastructure segments and off-survey paths interconnecting at least some of the on-survey paths; and,
  b) generates path data at least partially indicative of the flight path, the path data being useable in generating control signals for at least partially controlling operation of the aircraft, in use.

It will be appreciated that the broad forms of the invention can be used independently, or in conjunction and that features of the broad forms can be used interchangeably.

BRIEF DESCRIPTION OF THE DRAWINGS

An example of the present invention will now be described with reference to the accompanying drawings, in which:—

DETAILED DESCRIPTION OF THE PREFERRED EMBODIMENTS

Figure 1:
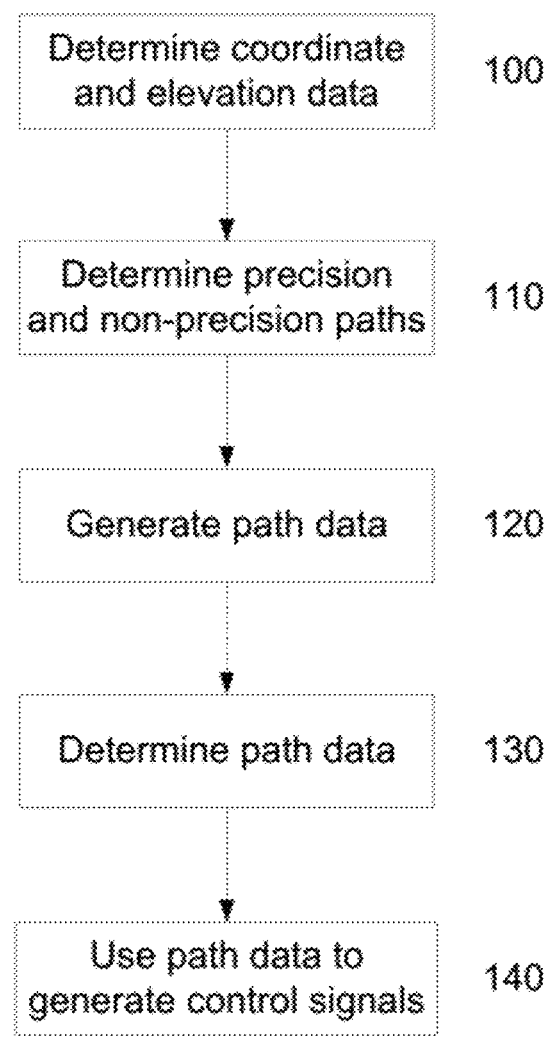
FIG. 1 is a flowchart of an example of a method for developing a flight path for precision flying and a method of controlling an aircraft for precision flying.

A method of developing a flight path and a method of controlling an aircraft for precision flying, such as infrastructure surveying, will now be described with reference to FIG. 1.

In this example, it is assumed that the process is performed at least in part using an electronic processing device forming part of a processing system, which may be connected to one or more other computer systems via a network architecture.

It is also further assumed that control of the aircraft is typically performed using a flight control system, such as a commercial autopilot, with an electronic processing device in communication with the flight control system. In this regard, the electronic processing device used for developing the flight plan and communicating with the flight control system may be the same electronic processing device or may be different electronic processing devices, as will be described in more detail below.

The term "precision flying" refers to flying in a controlled manner along a defined trajectory with control of at least the position and attitude of the aircraft, as well as other optional constraints such as velocity, rate of change of attitude, or the like, such that at least position and attitude is controlled to within a desired tolerance of at least specified position and attitude constraints. Precision flying can be used for sensing within an area of interest, either for infrastructure sensing, as will be described in more detail below, but also for other applications, such as searching or data collection, as well as for deployment, for example in spraying, package delivery applications or the like.

The term "infrastructure" is intended to cover any physical asset, facility or structure, and more typically a structure that extends over a distance of at least one kilometer, and more typically over tens or hundreds of kilometers. The infrastructure may include a single structure, or a network of multiple connected or unconnected structures, and can include, but is not limited to, power lines, telecommunications lines, pipelines, roadways, railways, canals, fences, or the like.

In this example, at step 100, the electronic processing device determines coordinate and elevation data relating to an area of interest and/or to infrastructure to be surveyed. The nature of the coordinate and elevation data may vary depending upon the preferred implementation. In one example, the coordinate and elevation data are separate data sets, but this is not essential, and a single combined data set could be used.

The coordinate data may specify coordinates of particular parts of an area of interest, such as extents of a boundary, or the like. Similarly, the coordinate data may specify coordinates of particular parts of an infrastructure, so for power lines for example, the coordinates may specify the location of transmission towers, power line poles, or other supporting structures. The elevation data may relate only to the elevation of particular parts of the infrastructure, but typically relates to the elevation of the terrain in the area of interest, which can be a region immediately surrounding the infrastructure and more typically to entire flight region. Thus, it will be appreciated that the elevation data may include terrain information from terrain model, mapping survey, or the like.

The coordinate and elevation data may be determined in any appropriate manner. In one example, the data is stored in a store, such as a remote database and accessed by the electronic processing device as needed. However, this is not essential and alternatively the coordinate and elevation data may be received by the electronic processing device via a communications network, received from sensor information or satellite images, or wholly or partially entered by a user.

At step 110 the electronic processing device uses the coordinate and elevation data to determine a flight path including a combination of precision and non-precision paths. In this regard, the precision paths correspond to precision flying trajectories, whilst the non-precision paths interconnect the precision flying trajectories and typically have a reduced tolerance in terms of attitude and/or altitude requirements. In this regard, the precision path is a portion of the flight path during which precision flying is being performed, for example for the purpose of sensing or deployment. The precision path is typically planned as part of an overall sequence of precision paths, allowing an overall sensing or deployment requirement to be met. Thus, for example, in sensing, this could correspond to overflying an entire area so as to allow the whole area to be imaged, for example for surveying the area, performing searching, or the like. In deployment, an entire area may need to be covered, for example when spraying an area, for example in crop spraying or oil dispersion applications, or only specific parts of the area, for example if supplies are being dropped from an aircraft into a relief zone, or water bombing a bush fire, or the like. In general, when flying on a precision flight path, this requires that at least the position and attitude of the aircraft is controlled to ensure targeted sensing or deployment.

In contrast, the non-precision paths are used to connect the precision flight paths and consequently, the same degree of tolerance to desired constraints is not required.

When surveying infrastructure, the precision and non-precision paths equate to on-survey paths corresponding to infrastructure segments and off-survey paths interconnecting at least some of the on-survey paths. In this regard, the term on-survey path is generally used to refer to any portion of the flight path where the aircraft is overflying the infrastructure, or is overflying the infrastructure for a majority of the time. Consequently, on-survey paths correspond to section of the flight path for which a sensor, such as LiDAR sensor, is activated to thereby sense the infrastructure. It will be appreciated that the on-survey paths may include short segments where there is no infrastructure present, such as if an aircraft is flying perpendicularly across parallel spaced apart power lines, or the like. In one preferred example, the on-survey paths generally correspond to segments of the infrastructure, and in one particular example substantially linear segments, although this is not essential, as will be described in more detail below.

The off-survey paths correspond to sections of flight path that interconnect on-survey paths and for which the sensor is typically deactivated. Whilst all of the on-survey paths may be interconnected by off-survey paths, this is not essential and in some examples, on-survey paths may be effectively directly interconnected. This may occur, for example, if the on-survey paths correspond to linear segments, and linear segments are in abutment with only a minor change in direction therebetween, although this could also be considered as a single non-linear on-survey path. This can be achieved by directly interconnecting the on-survey segments, but more typically this is achieved as part of the optimisation process by providing an interconnecting off-survey path having a zero or near zero path length.

The flight path can be determined in any appropriate manner, but this is typically achieved by having the electronic processing device determine potential sequences of precision or on-survey paths, generate non-precision or off-survey paths between at least some of the precision or on-survey paths, and then perform an optimisation process on both the precision or on-survey and non-precision or off-survey paths, to thereby determine the flight path. The optimisation process can be performed to reduce the flight path length whilst also meeting other requirements, such as to avoid intersections with terrain or no-fly zones, whilst also ensuring adequate sensor coverage of the infrastructure.

At step 120, the electronic processing device generates path data at least partially indicative of the flight path, the flight path data being useable in generating control segments for at least partially controlling operation of the aircraft in use. The flight path data can be of any appropriate form, and can include control signals for an aircraft flight control system, information regarding sequences of precision and non-precision or on-survey and off-survey segments, but more typically includes a sequence of precision or on-survey segments allowing non-precision or off-survey sequences to be calculated during flight.

The above steps may be performed by an electronic processing device that is ground based with this being performed as a part of a flight planning step prior to implementation by an aircraft. In this instance, the path data can then be transferred to an aircraft, for example using a suitable communication technique such as wireless transfer via a communications network, or transfer on physical media such as a USB (Universal Serial Bus) storage device, or the like. Alternatively, the flight path may be calculated on board and stored for use as required, or generated dynamically during flight.

In the event that the flight path data is previously determined, at step 130 the aircraft electronic processing device determines the path data, which as mentioned above, is at least indicative of the flight path. Thus, this may involve retrieving the flight path from a store, or calculating the flight as outlined above with respect to steps 100 to 120 above.

At step 140 the aircraft electronic processing device generates control signals for at least partially controlling at least one of the attitude, pitch and altitude of the aircraft using the path data. As part of this process, the aircraft electronic processing device may need to generate information regarding the flight path, so for example, this could include calculating non-precision or off-survey segments from precision or on-survey segments, respectively. Furthermore, this may be performed at least partially based on a current aircraft position, as will be described in more detail below.

Whilst the above described process is described as being performed by a ground based electronic processing device and a separate aircraft based electronic processing device this is not essential and alternatively, a single aircraft based electronic processing device can be used to perform each of steps 100 to 140 as will be described in more detail below.

In any event, in the above described process, and in contrast to traditional techniques, the method includes taking into account elevation data during the flight path development phase. By taking into account elevation data, this allows one or more of the speed (such as the air speed or ground speed), pitch or altitude of the aircraft to be controlled, which cannot be achieved using either traditional manual or 2D flight planning techniques. This in turn allows an autopilot or other flight control system to take control of one or more of the aircraft speed, altitude or pitch, reducing the mental burden on the pilot. This in turn makes it easier for the pilot to monitor operation of the aircraft and allowing the pilot to fly for longer periods of time. This vastly enhances the rate at which infrastructure can be surveyed.

A further benefit of utilising elevation data is that this allows the planning process to exclude flight paths that would intersect with terrain, which would not necessarily be excluded using traditional techniques.

In addition, in the above described techniques, the electronic processing device uses coordinate and elevation data to generate both precision and non-precision or on-survey and off-survey paths. This is in contrast to traditional techniques in which the precision or on-survey paths are defined manually. Calculating both the on and off-survey paths as part of the same planning process allows both on-survey and off-survey segments to be optimised in conjunction, which in turn leads to unexpected benefits, in some instance resulting in significantly shorter flight paths whilst covering the same amount of infrastructure. This can be achieved using flight paths that would be excluded under previous planning regimes, as will be described in more detail below.

Accordingly, it will be appreciated that the above described planning and control processes offer significant advantages over existing flight path planning and execution techniques.

A number of further features will now be described.

Typically the precision paths are for at least one of sensing at least part of the area of interest and deployment into the area of interest. The method generally includes controlling at least the attitude and position of the aircraft on the precision paths.

It will be appreciated from the above that infrastructure surveying is one specific example of precision flying. For the purpose of ease of explanation, the following description will focus on surveying of infrastructure. However, it will be appreciated that this is one example and is not intended to be limiting. Consequently any techniques for infrastructure surveying can be applied to precision flying, and these examples should therefore be considered interchangeably, with the terms precision path and non-precision path being considered equivalent to on-survey and off-survey paths, respectively.

In one example the method of developing a flight path includes, in the electronic processing device, identifying infrastructure segments from the coordinate data, grouping the infrastructure segments and determining a flight path for each group of infrastructure segments. This is typically performed to group infrastructure segments into missions that are feasible for an aircraft and pilot to fly. The grouping can be achieved in any suitable manner but is typically based on at least one of a flight time and flight distance requirement, and may also depend on other factors, such as vicinities to airfields or the like. Thus, a total length of the infrastructure segments, or time taken to fly the infrastructure segments, can be used to select a number of segments that can be combined to form a given mission. It will be appreciated that this allows the mapping of a large region to be broken down into individual missions, simplifying the task of planning the flight path.

In one example, the flight path is determined by the electronic processing device in part using an aircraft flight path model and at least one of sensor coverage and deployment parameters. The aircraft flight path model can be any form of model that can be used to model the aircraft flight capabilities and can include a geometric path model (such as simply lines and curves for paths), through to a full aerodynamic model that takes into account flight capabilities of the aircraft, such as the maximum and minimum bank and turn angles, using these to place limitations on the flight path that can be calculated. Additionally the sensor coverage parameters are used to restrict the orientation of the aircraft relative to the infrastructure to ensure that the infrastructure is positioned within a sensor footprint, such as the lateral extent of an ALSM sensor as defined by the sensor field of view, allowing this to be taken into account to ensure that all infrastructure is covered by the survey. It will be appreciated that similar techniques could be used for other sensing applications, or for determining precision paths using deployment parameters for a deployment application, The process of determining the flight path typically involves having the electronic processing device determine a plurality of candidate on-survey path sets, determining a candidate flight path for each candidate on-survey path set and selecting the best candidate flight path from the candidate flight paths. Thus, multiple candidate on-survey path sets can be created and used to allow multiple candidate flight paths to be determined, with a best one of these then being selected. This allows an iterative process to be performed in which different overlapping on-survey paths sets are defined, with these being repeatedly modified in order to maximise the chance of a shortest optimum flight path being identified.

The process for determining a candidate flight path for each on-survey path set typically involves having the electronic processing device determine off-survey paths between pairings of on-survey paths within the set, for each possible sequence of on-survey paths calculating a flight path length and then selecting a flight path with the shortest flight path length as the candidate flight path, for the respective on-survey path set. Thus, it will be appreciated that this process will calculate possible off-survey paths between the on-survey paths and then use possible sequences of on-survey paths to calculate an overall path length. The possible sequences of on-survey paths can include paths where on-survey paths are effectively interconnected directly using an intervening off-survey path having a zero or minimal path length. Thus, there are multiple on-survey path sets with each one of these being used to identify a number of possible flight paths, with best one of these being selected to represent the candidate flight path for each set.

In this process, the off-survey paths are determined using the aircraft flight path model, which takes into account one or more of an aircraft heading rate constraint and speed, an aircraft maximum bank angle, an aircraft minimum turn radius, a required minimum altitude above an area of interest, or terrain and infrastructure, a flight path angle and rate of climb speed of the aircraft.

In general, the best candidate flight path is identified by determining a score for the candidate flight path from each on-survey path set and then selecting the best candidate flight path using the score. The score can be calculated taking into account one or more of intersections with terrain using the terrain data, intersections with no-fly zones using no-fly data indicative of no-fly zones, sensor or deployment device coverage, and a flight path length.

The above described steps are typically performed iteratively, with each iteration being based on different on-survey path sets. In this example, the process involves repeatedly determining a plurality of candidate flight paths, and each time selecting a new best candidate flight path. The new best candidate flight path is then compared to a current best flight path determined during a previous iteration, with the current best flight path being updated with the new best candidate flight path, depending on the results of the comparison. This process can be performed repeatedly until a stop condition is reached, such as when a set number of iterations have been performed, or until no additional improvement is identified, at which point the current best flight path is identified as the preferred flight path.

Once a preferred flight path has been identified, the electronic processing device generates the path data which typically includes on-survey segment data indicative of on-survey paths and an on-survey path sequence indicative of an order in which the on-survey paths should be flown. In this regard, it is not necessary to include off-survey paths in the flight data as these can be calculated during flight. Whilst this increases the computational load on the electronic processing device in the aircraft, as the on-survey segments and the order on which they are flown has previously been determined, the calculation of off-survey flight paths is relatively straightforward, using the aircraft flight path model. It will also be appreciated that in any event the ability to calculate flight paths during flight is important in case there are deviations of the aircraft from the intended flight path.

The flight path data can be used in controlling the pitch and altitude of the aircraft, as well as the roll, yaw, engine power or the like. The path data can also be used for controlling a sensor, for example by ensuring the sensor is active when flying on-survey paths and inactive when flying off-survey paths. Similar techniques could also be applied to control of a deployment device on precision paths.

In use, the electronic processing device will typically determine a current aircraft position and then calculate the flight path based on the current aircraft position. This allows the aircraft to take into account deviation of the aircraft from the planned flight path, as well as to allow go-arounds or the like if infrastructure or part of an area of interest is missed. In order to achieve this, the aircraft electronic processing device will typically determine a current aircraft position, determine a flight path segment in accordance with the current aircraft position and then generate control signals for at least partially controlling the aircraft using the flight path segment. In performing this operation the electronic processing device will determine a current on-survey path using the current aircraft position, determine one or more next on-survey paths from path data and then determine any off-survey paths connecting the current and next on-survey paths using the aircraft flight path model. In this regard, if the paths are short it will be typical to plan two, three or more paths ahead.

In use, the electronic processing device typically provides control signals to a flight control system, such as a commercial autopilot, allowing the flight control system to control the aircraft at least partially in accordance with the control signals. In this regard, it will be appreciated that commercial flight control systems exist that are capable of controlling aspects of aircraft flight including altitude, pitch, roll, yaw, speed or the like, based on received input commands. By allowing the electronic processing device to interface with an existing flight control system this simplifies the process of implementing the flight control process in an existing aircraft. For example, this allows existing certified equipment to be used for actual control of the aircraft, thereby facilitating a simpler certification process for the electronic processing device. It will also be appreciated that the aircraft can also be further equipped with other safety systems such as stall-inhibitors, terrain anti-collision devices, or the like, and that these will remain unaffected by the electronic processing device.

Additionally, the electronic processing device can be adapted to determine if the aircraft is on an on-survey path and then selectively activate and deactivate a sensor depending on the results of the comparison. Thus, this process allows the electronic processing device to automatically activate and deactivate the sensor upon entering onto or leaving an on-survey path, respectively. Consequently, the sensor is only used on on-survey paths, thereby reducing the amount of data collected, whilst ensuring that data is sensed for the entirety of the infrastructure. Similar techniques could also be applied to control of a deployment device on precision paths.

Additionally, the electronic processing device can also operate to monitor the sensor, determine if infrastructure has been sensed, and if not modify the flight path. In this regard, the sensor can be adapted to detect when sensing of infrastructure has been missed and trigger a go-around to ensure the infrastructure has been correctly captured.

Figure 2:
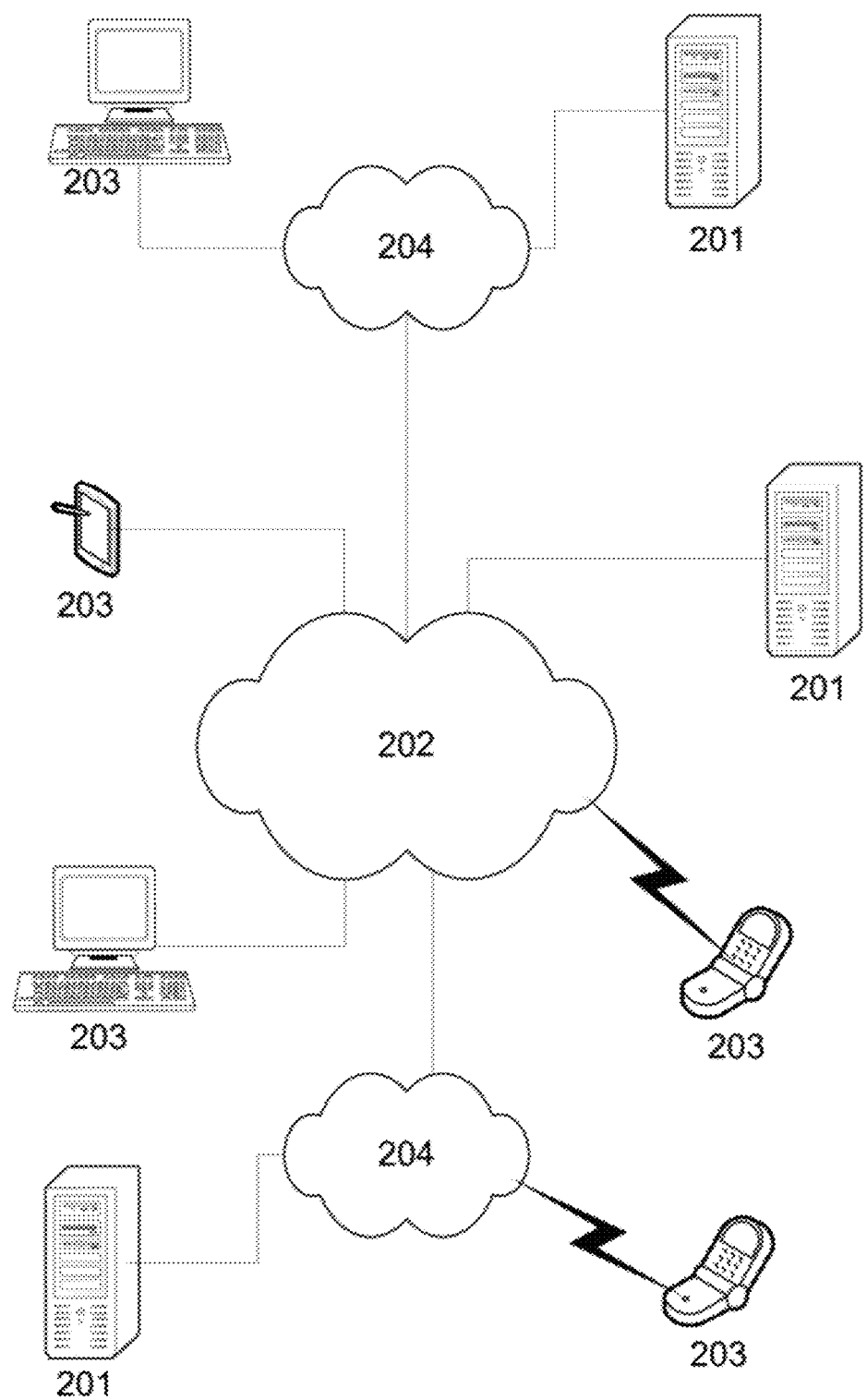
FIG. 2 is a schematic diagram of an example of a distributed computer architecture.

In one example, the above described flight planning process can be performed by one or more processing systems operating as part of a distributed architecture, an example of which will now be described with reference to FIG. 2.

In this example, the arrangement includes a number of processing systems 201 and computer systems 203 interconnected via one or more communications networks, such as the Internet 202, and/or a number of local area networks (LANs) 204. It will be appreciated that the configuration of the networks 202, 204 is for the purpose of example only, and in practice the processing and computer systems 201, 203 can communicate via any appropriate mechanism, such as via wired or wireless connections, including, but not limited to mobile networks, private networks, such as an 802.11 networks, the Internet, LANs, WANs, or the like, as well as via direct or point-to-point connections, such as Bluetooth, or the like.

The use of separate terms "processing system" and "computer system" is for illustrative purposes and to enable distinction between different devices, optionally having different functionality. For example, the processing and computer systems 201, 203 could represent servers and clients respectively, as will become apparent from the following description. However, this is not intended to be limiting and in practice any suitable computer network architecture can be used.

Figure 3:
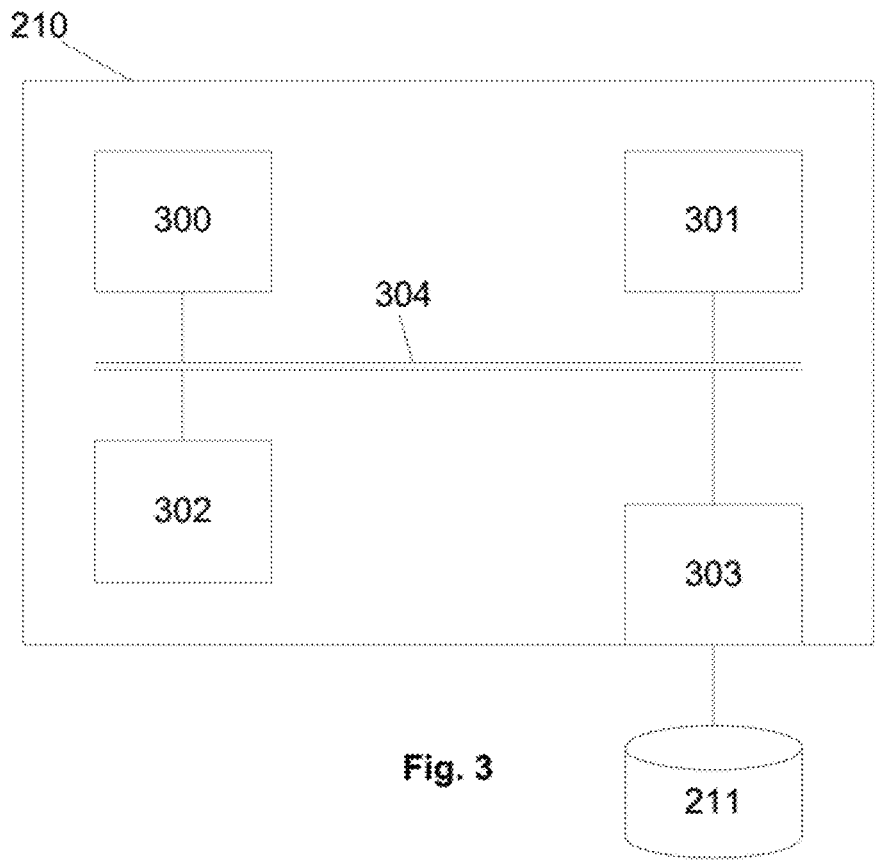
FIG. 3 is a schematic diagram of an example of a processing system.

An example of a suitable processing system 201 is shown in FIG. 3. In this example, the processing system 201 includes an electronic processing device, such as at least one microprocessor 300, a memory 301, an optional input/output device 302, such as a keyboard and/or display, and an external interface 303, interconnected via a bus 304 as shown. In this example the external interface 303 can be utilised for connecting the processing system 201 to peripheral devices, such as the communications networks 202, 204, databases 211, other storage devices, or the like. Although a single external interface 303 is shown, this is for the purpose of example only, and in practice multiple interfaces using various methods (eg. Ethernet, serial, USB, wireless or the like) may be provided.

In use, the microprocessor 300 executes instructions in the form of applications software stored in the memory 301 to perform required processes, such as communicating with other processing or computer systems 201, 203. Thus, actions performed by a processing system 201 are performed by the processor 300 in accordance with instructions stored as applications software in the memory 301 and/or input commands received via the I/O device 302, or commands received from other processing or computer systems 201, 203. The applications software may include one or more software modules, and may be executed in a suitable execution environment, such as an operating system environment, or the like.

Accordingly, it will be appreciated that the processing systems 201 may be formed from any suitable processing system, such as a suitably programmed computer system, PC, web server, network server, or the like. In one particular example, the processing systems 201 are standard processing system such as a 32-bit or 64-bit Intel Architecture based processing system, which executes software applications stored on non-volatile (e.g., hard disk) storage, although this is not essential. However, it will also be understood that the processing system could be or could include any electronic processing device such as a microprocessor, microchip processor, logic gate configuration, firmware optionally associated with implementing logic such as an FPGA (Field Programmable Gate Array), or any other electronic device, system or arrangement.

Figure 4:
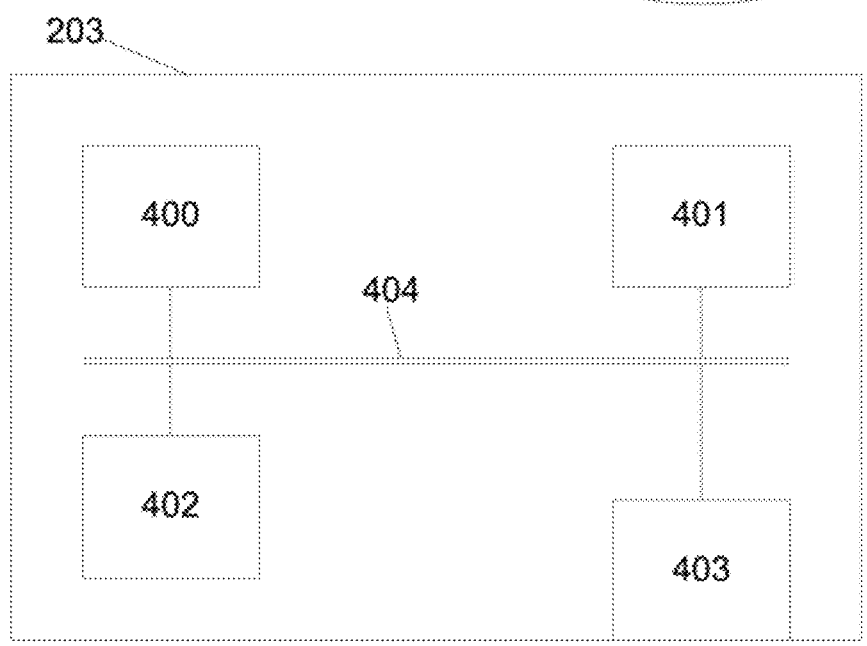
FIG. 4 is a schematic diagram of an example of a computer system.

As shown in FIG. 4, in one example, the computer systems 203 include an electronic processing device, such as at least one microprocessor 400, a memory 401, an input/output device 402, such as a keyboard and/or display, and an external interface 403, interconnected via a bus 404 as shown. In this example the external interface 403 can be utilised for connecting the computer system 203 to peripheral devices, such as the communications networks 202, 204, databases, other storage devices, or the like. Although a single external interface 403 is shown, this is for the purpose of example only, and in practice multiple interfaces using various methods (eg. Ethernet, serial, USB, wireless or the like) may be provided.

In use, the microprocessor 400 executes instructions in the form of applications software stored in the memory 401 to perform required processes, for example to allow communication with other processing or computer systems 201, 203. Thus, actions performed by a processing system 203 are performed by the processor 400 in accordance with instructions stored as applications software in the memory 401 and/or input commands received from a user via the I/O device 402. The applications software may include one or more software modules, and may be executed in a suitable execution environment, such as an operating system environment, or the like.

Accordingly, it will be appreciated that the computer systems 203 may be formed from any suitable processing system, such as a suitably programmed PC, Internet terminal, lap-top, hand-held PC, smart phone, PDA, tablet, or the like. Thus, in one example, the processing system 300 is a standard processing system such as a 32-bit or 64-bit Intel Architecture based processing system, which executes software applications stored on non-volatile (e.g., hard disk) storage, although this is not essential. However, it will also be understood that the processing systems 203 can be any electronic processing device such as a microprocessor, microchip processor, logic gate configuration, firmware optionally associated with implementing logic such as an FPGA (Field Programmable Gate Array), or any other electronic device, system or arrangement.

It will also be noted that whilst the processing and computer systems 201, 203 are shown as single entities, it will be appreciated that this is not essential, and instead one or more of the processing and/or computer systems 201, 203 can be distributed over geographically separate locations, for example by using processing systems provided as part of a cloud based environment.

In one example, the processing system 201 is used to calculate the flight path, with this being transferred to one of the computer systems 203, for subsequent transfer to an onboard aircraft computer system. It will also be assumed that the user interacts with the processing system via a GUI (Graphical User Interface), or the like, presented on the user computer system 203.

However, it will be appreciated that the above described configuration assumed for the purpose of the following examples is not essential, and numerous other configurations may be used. It will also be appreciated that the partitioning of functionality between the processing and computer systems 201, 203 may vary, depending on the particular implementation, so that for example, the flight planning method could be performed solely on the computer system 203, which may or may not be coupled to a communications system. Alternatively, the computer system 203 can represent the onboard aircraft electronic processing device, coupled to a processing system 201 that operates to plan the flight path.

A second example of a method of developing a flight path for infrastructure surveying by an aircraft will now be described with reference 5A to 5E.

Figure 5A:
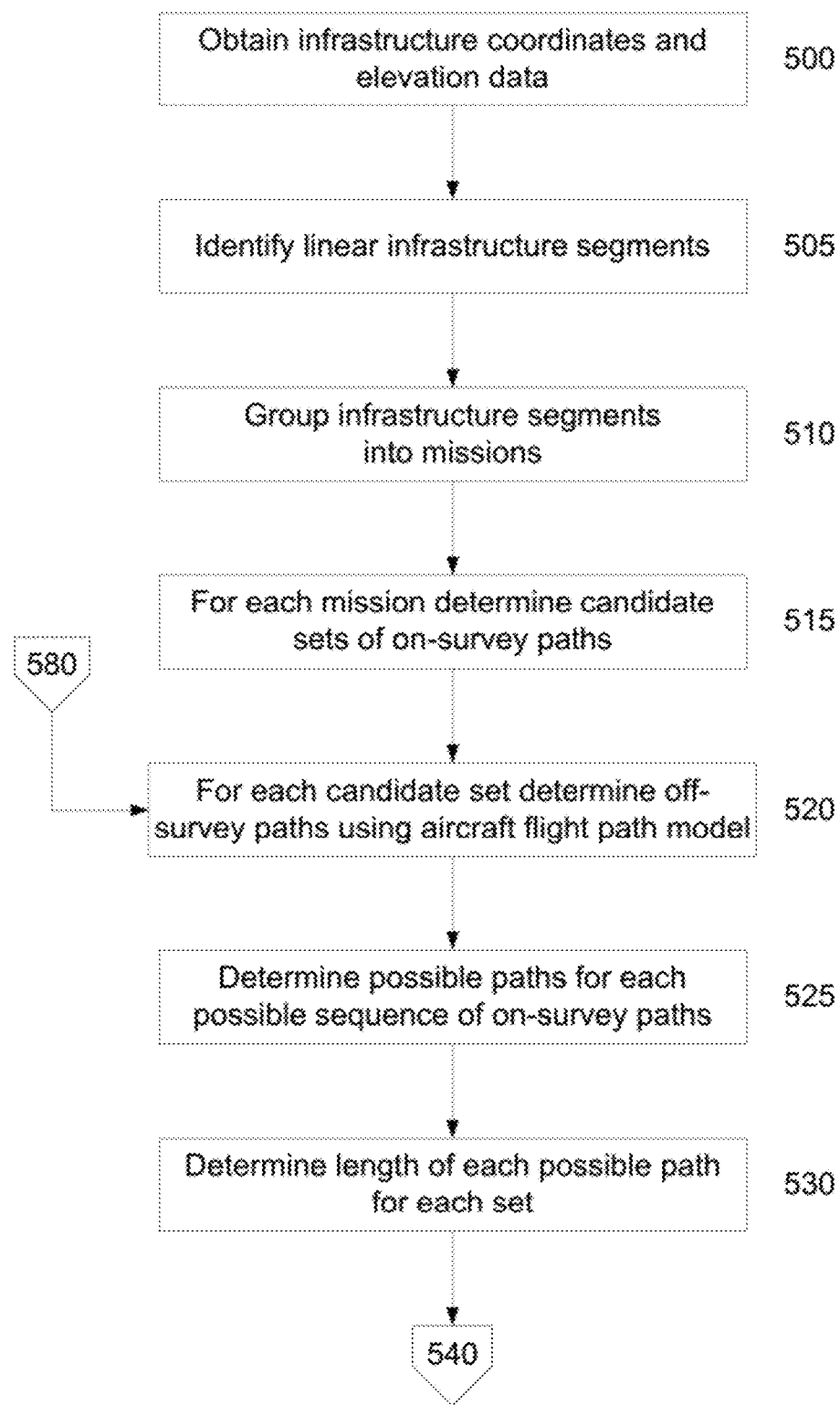
FIGS. 5A to 5C are a flowchart of an example of a method of developing a flight path for infrastructure surveying by an aircraft.
Figure 5B:
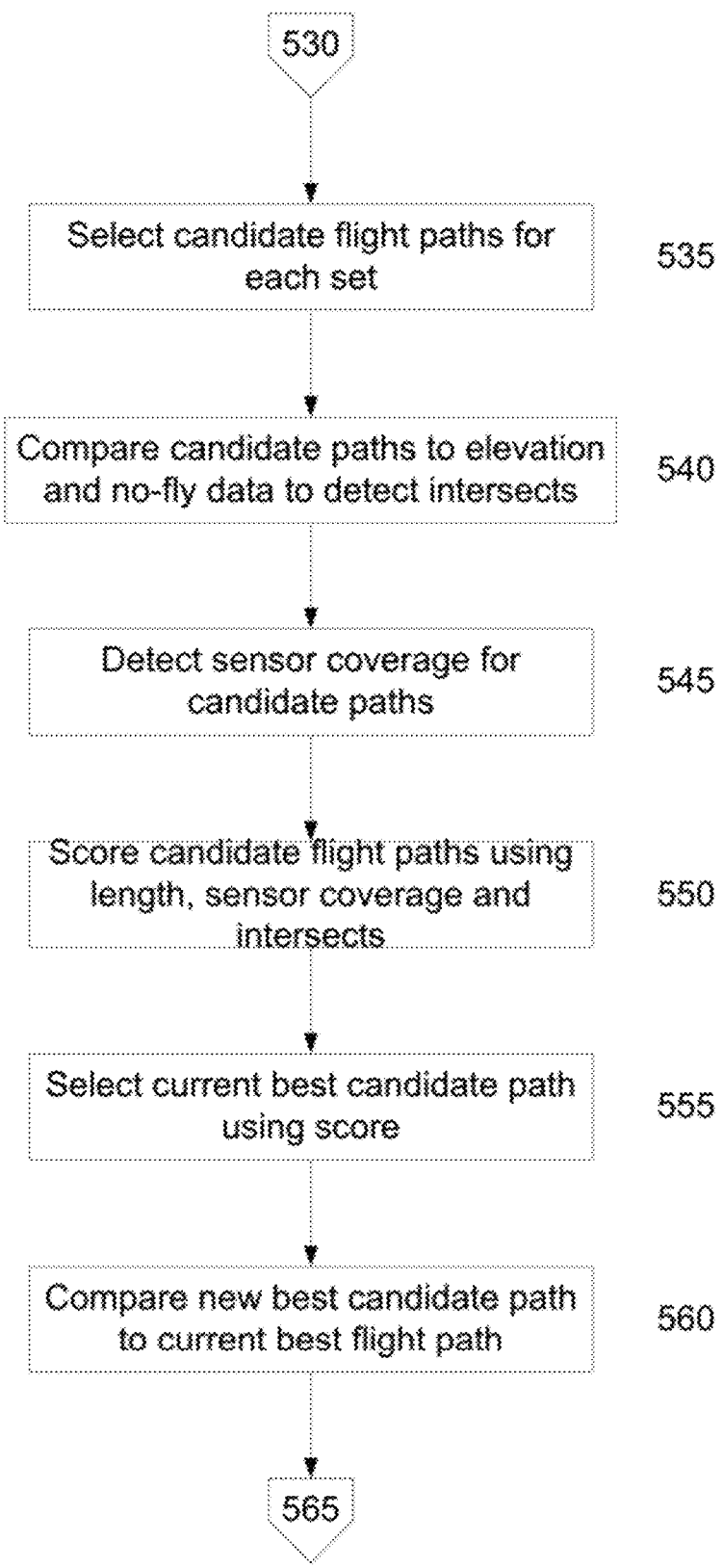
Figure 5C:
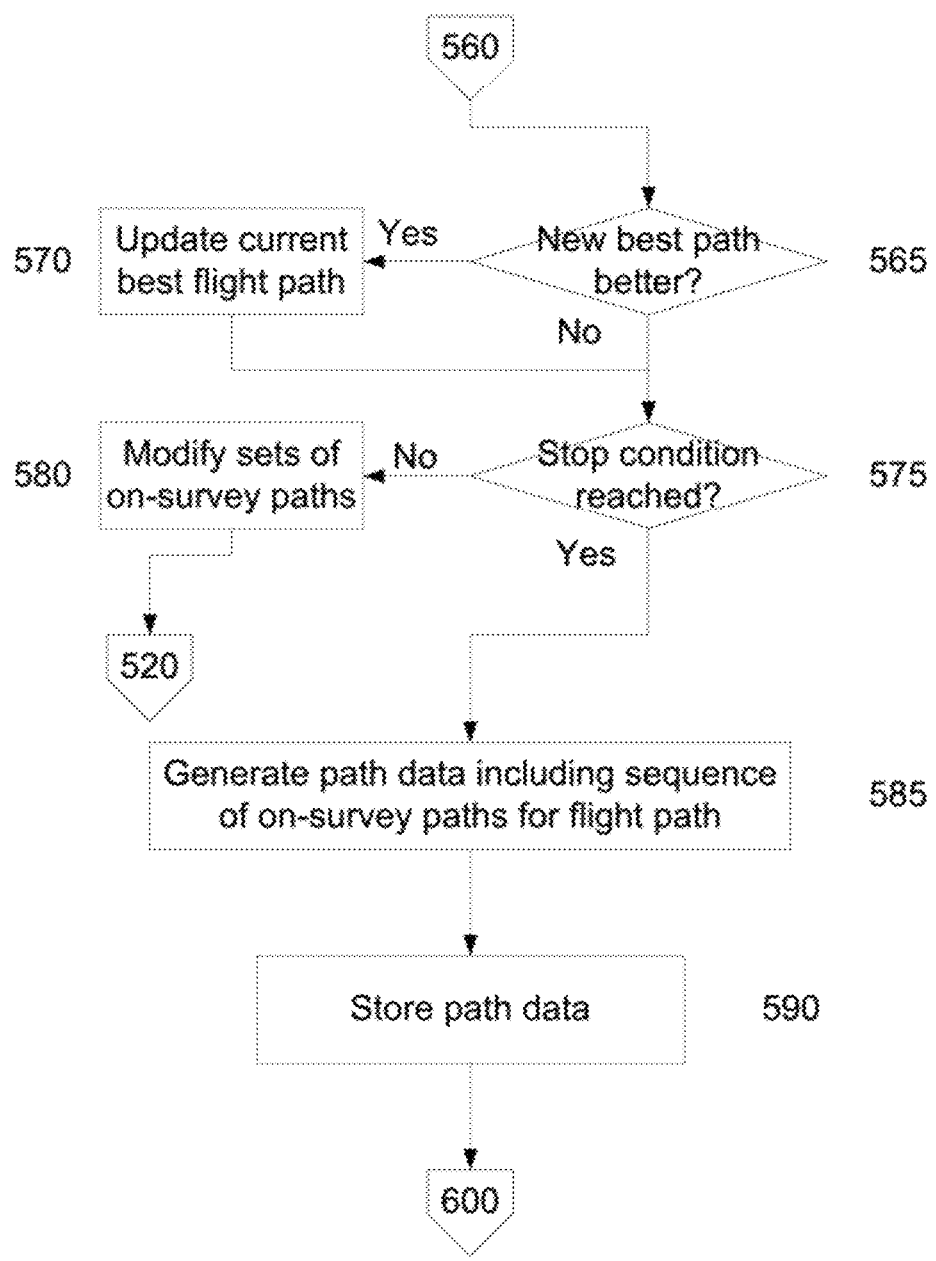
Figure 5D:
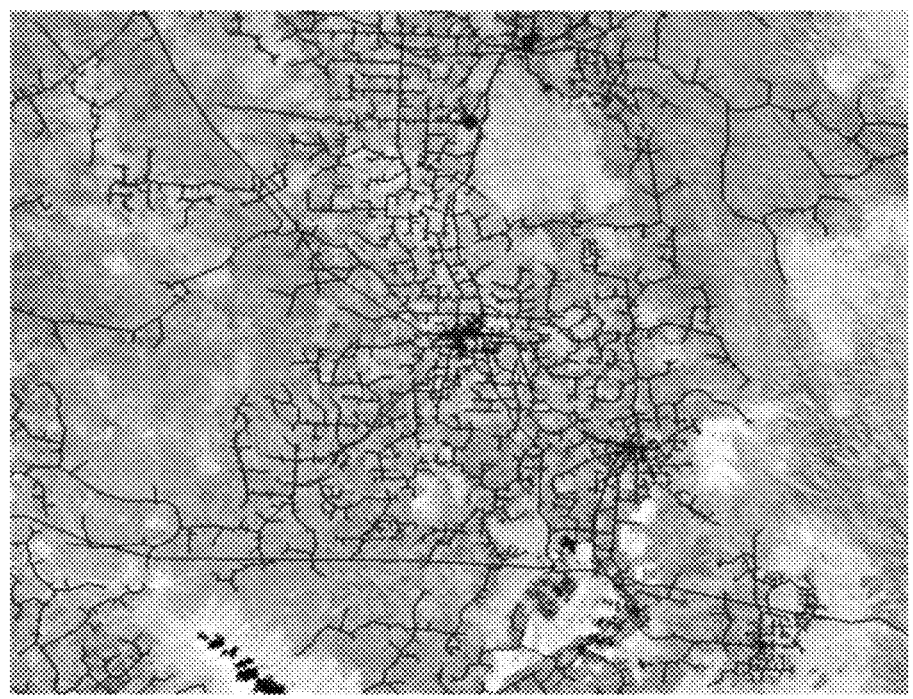
FIG. 5D is an image of example infrastructure segments.

In this example, at step 500 the electronic processing device 201 obtains infrastructure coordinates and elevation data, typically by retrieving these from the database 211 or receiving them from one or more remote processing or computer systems, via one of the communications networks 202, 204. An example power line infrastructure is shown in FIG. 5D, and in one example, the coordinates represent the location of transmission towers. The elevation data may be of any form, but is typically a digital elevation model (DEM), digital terrain model (DTM), digital surface model (DSM) or the like, and may be obtained from survey and/or remote sensing of terrain in the region containing the infrastructure.

At step 505, the processing system 201 identifies infrastructure segments within the infrastructure coordinates, and then groups these segments into missions at step 510. Grouping into missions is performed to define a limited dataset of segments for which flight path planning and optimisation can be feasibly performed, as well as to allow for individual flight paths to be defined that can be reasonably flown by a pilot without undue fatigue. The grouping can be performed on the basis of any suitable criteria, such as a number or total length of the infrastructure segments, and may also take into account other factors, such as the flight time of the segments, the distance from an airfield, and hence the round trip flight time. It will be appreciated that this is also typically based to some extent on the location of the infrastructure segments, ensuring that the infrastructure segments in a given common area are assigned to a common mission. The grouping can be performed in any suitable manner and can use a known clustering algorithm or the like.

At step 515, for each mission, the processing system 201 determines candidate sets of on-survey paths. The on-survey paths are typically represented by agents that are designed to be used in a suitable optimisation algorithm and may therefore be in the form of cooperative optimisation agents (analogous to genes, fireflies, or the like), depending on the nature of the optimisation algorithm used, as will be described in more detail below.

At step 520, the processing system 201 determines off-survey paths using an aircraft flight path model for each candidate set. The off-survey paths are determined for each possible pairing of on-survey paths within the set, and for each possible direction of travel along the on-survey paths. Following this, at step 525 the electronic processing device determines possible flight paths for each possible sequence of on-survey paths, including on-survey paths in reverse directions, and using the off-survey paths generated at step 520 to link the on-survey paths.

The processing system 201 then determines the length of each of these possible flight paths, and selects a best one of the possible flight path to form the candidate flight path for each set at step 535. Typically each iteration of the algorithm will use fifteen or so sets, in which case, at this point fifteen candidate flight paths are identified, although it will be appreciated that any suitable number can be used.

The next stage is for the processing system 201 to evaluate which of these candidate flight paths is the best candidate flight path for the current iteration. The evaluation takes into account not only the length of the candidate flight paths, but also other factors including the extent to which acceptable sensor coverage will be obtained, whilst also ensuring that the paths do not pass through no-fly zones or lead to potential violations of a minimum safe altitude above terrain. To achieve this, at step 540 the processing system 201 compares the candidate flight paths to the elevation data and to no-fly data, indicative of no-fly zones, such as restricted airspace. The processing system 201 uses the comparison to detect potential intersects with either elevation or no-fly zones, with potential intersects then being used to determine a first score, with any intersecting paths being given a low first score.

Figure 5E:
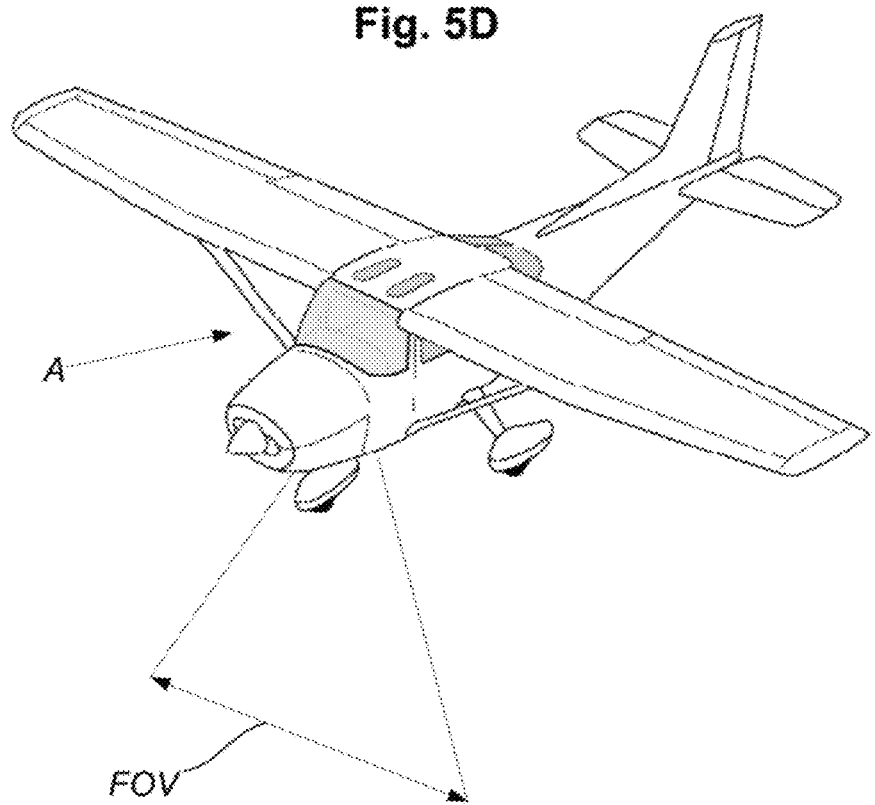
FIG. 5E is a schematic diagram illustrating example sensor coverage for an aircraft.

At step 545, the processing system 201, calculates sensor coverage for each of the candidate flight paths, which takes into account whether the infrastructure would be located within a sensor field of view FOV dependent on a lateral extent of the sensor footprint, as shown for the aircraft A in FIG. 5E. It will be appreciated that this can depend on factors such as the roll angle of the aircraft, or the lateral offset between a centre line of the aircraft and the infrastructure, as detected from on board aircraft sensors. In one example, if the on-survey paths are linear, the roll angle can be assumed to be zero, in which case the relative lateral position of the aircraft and infrastructure segment alone can be used to determine whether the infrastructure is within the field of view. Once this has been determined, for each candidate flight path, the proportion of the infrastructure that is within the field of view of any of the on-survey paths in the candidate flight path is used to generate a second score. It will be appreciated however that other measures such as the amount of time the infrastructure is within the field of view could be used.

Similarly, the path length is used to determine a third score, with the third score being lower for longer path lengths. The processing system 201 then combines the first, second and third scores, to generate an overall score for each candidate flight path at step 550. Thus, the score will be formed from components dependent on the path length, path intersects with terrain and no-fly zones and infrastructure sensor coverage, with paths being given a low score if there are intercepts, poor sensor coverage or long path lengths.

It will be appreciated that the calculation of an overall score can be performed in any manner, and that this can vary depending on the implementation. Furthermore, the individual scores and their combination can be determined to reflect the relative importance of the different factors, so different weightings could be applied to different scores. For example, the calculation would typically be performed so that a candidate flight path with good sensor coverage but intersects with terrain, would not be selected in preference to a candidate flight path having poorer sensor coverage but no intersects.

In any event, at step 555, the processing system 201 selects a new best candidate flight path using the score, which in this case is the candidate flight path with the highest score for the current iteration, and then compares this to a current best flight path, which is the best candidate flight path from previous iterations, at step 560.

At step 565 the processing system 201 determines if the new best candidate flight path is better than the current best flight path, and if so replaces the current best flight path with the new best candidate flight path at step 570. In this regard, it will be appreciated that on the first iteration the new best candidate flight path becomes the current best flight path, whereas on subsequent iterations this will only occur if the new best candidate flight path has a better score than the current best flight path.

In either case, at step 575 the processing system 201 determines if a stop condition has been reached. A stop condition will typically correspond to a predetermined number of iterations, or alternatively a predetermined improvement (or lack of improvement) of the current best flight path over a set number of iterations, and is used to terminate the iterative process at suitable point when no further meaningful improvement is being obtained.

If the stop condition has not been reached, then the processing system 201 modifies the set of on-survey flight paths at step 580. In particular, the processing system 201 will use predetermined rules in order to modify the agents representing the on-survey paths. It will be appreciated that in the above described process any candidate paths are retained. However, the agents are modified so that at each iteration, the worst solutions gradually approach the best solution so that with increasing number of iterations, the gap between worst and best solutions becomes smaller and smaller. The modification is typically performed based on the agents used for determining the current best flight path, or the best candidate flight paths identified in previous iterations, so that attributes of the best candidate flight paths propagate to the agents of the candidate sets in the next iteration. This helps progressively improve the candidate flight paths on each iteration, thereby optimising the resulting flight paths, as will be appreciated by persons skilled in the art.

Once the sets have been modified the process returns to step 520, allowing off-survey paths to be determined for each of the modified sets.

Once a stop condition is reached, the processing system 201 uses the current best flight path to define the flight path that will be used by generating path data including a sequence of on-survey paths. This path data can then be stored for subsequent transfer to the aircraft at step 590.

The above described process may utilise individual modules in order to perform different aspects of the flight planning method. In particular, the processing system 201 can implement a mission planning module in order to identify segments and group these into missions at step 505 and 510. A survey optimiser module can be used for optimising the survey by performing steps 515 and 540 onwards, whilst a survey path planning module is used for identifying the candidate flight paths at steps 520 to 535. However, this is not essential and any suitable processes or delineation of tasks can be used.

Figure 6:
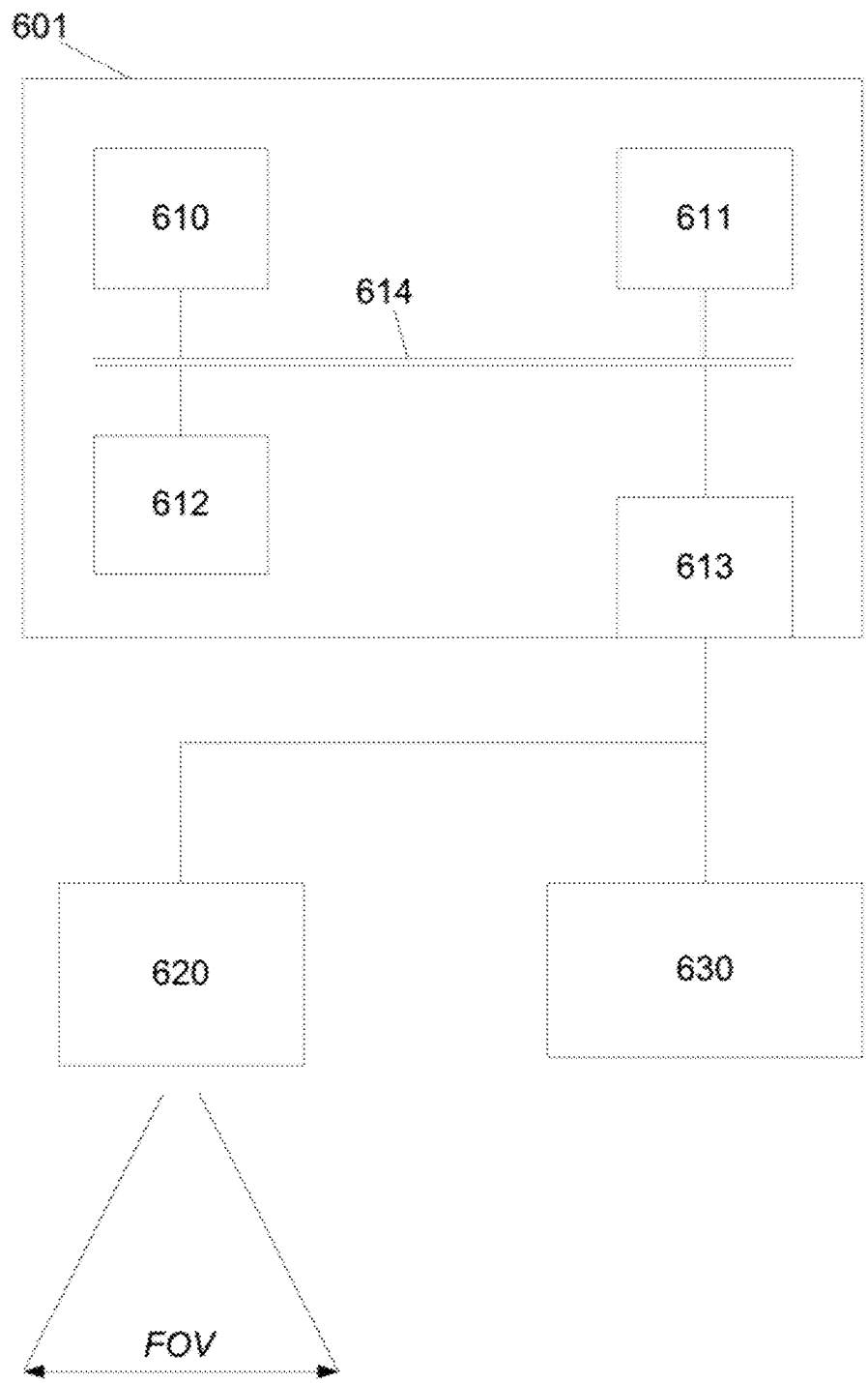
FIG. 6 is a schematic diagram of an example of an aircraft control system.

An example of apparatus for controlling an aircraft will now be described with reference to FIG. 6.

In this example, an apparatus includes an aircraft processing system 601, which is coupled to a sensor 620 defining a field of view FOV, such as a LiDAR system, and a flight control system 630 such as a commercial autopilot or the like.

The aircraft processing system 601 includes an electronic processing device, such as at least one microprocessor 610, a memory 611, an optional input/output device 612, such as a touch screen display, and an external interface 613, interconnected via a bus 614 as shown. In this example the external interface 613 can be utilised for connecting the aircraft processing system 601 to the flight control system 630 and sensor 620, and optionally to communications networks 202, 204, or other storage devices, or the like. Although a single external interface 613 is shown, this is for the purpose of example only, and in practice multiple interfaces using various methods (eg. Ethernet, serial, USB, wireless or the like) may be provided.

In use, the microprocessor 610 executes instructions in the form of applications software stored in the memory 611 to perform required processes, such as using path data to generate control signals for the flight control system. Thus, actions performed by the aircraft processing system 601 are performed by the processor 610 in accordance with instructions stored as applications software in the memory 611 and/or input commands received via the I/O device 612, or commands received from other processing or computer systems 201, 203. The applications software may include one or more software modules, and may be executed in a suitable execution environment, such as an operating system environment, or the like.

Accordingly, it will be appreciated that the aircraft processing system 601 may be formed from any suitable processing system, such as a suitably programmed computer system. In one particular example, the aircraft processing system 601 is custom hardware specifically configured to interface with flight control systems, and could therefore include any electronic processing device such as a microprocessor, microchip processor, logic gate configuration, firmware optionally associated with implementing logic such as an FPGA (Field Programmable Gate Array), or any other electronic device, system or arrangement. In one further example, the aircraft processing system 601 could be equivalent to a computer system 203 described with respect to FIG. 2, and coupled to the communications networks using wireless networks.

Figure 7A:
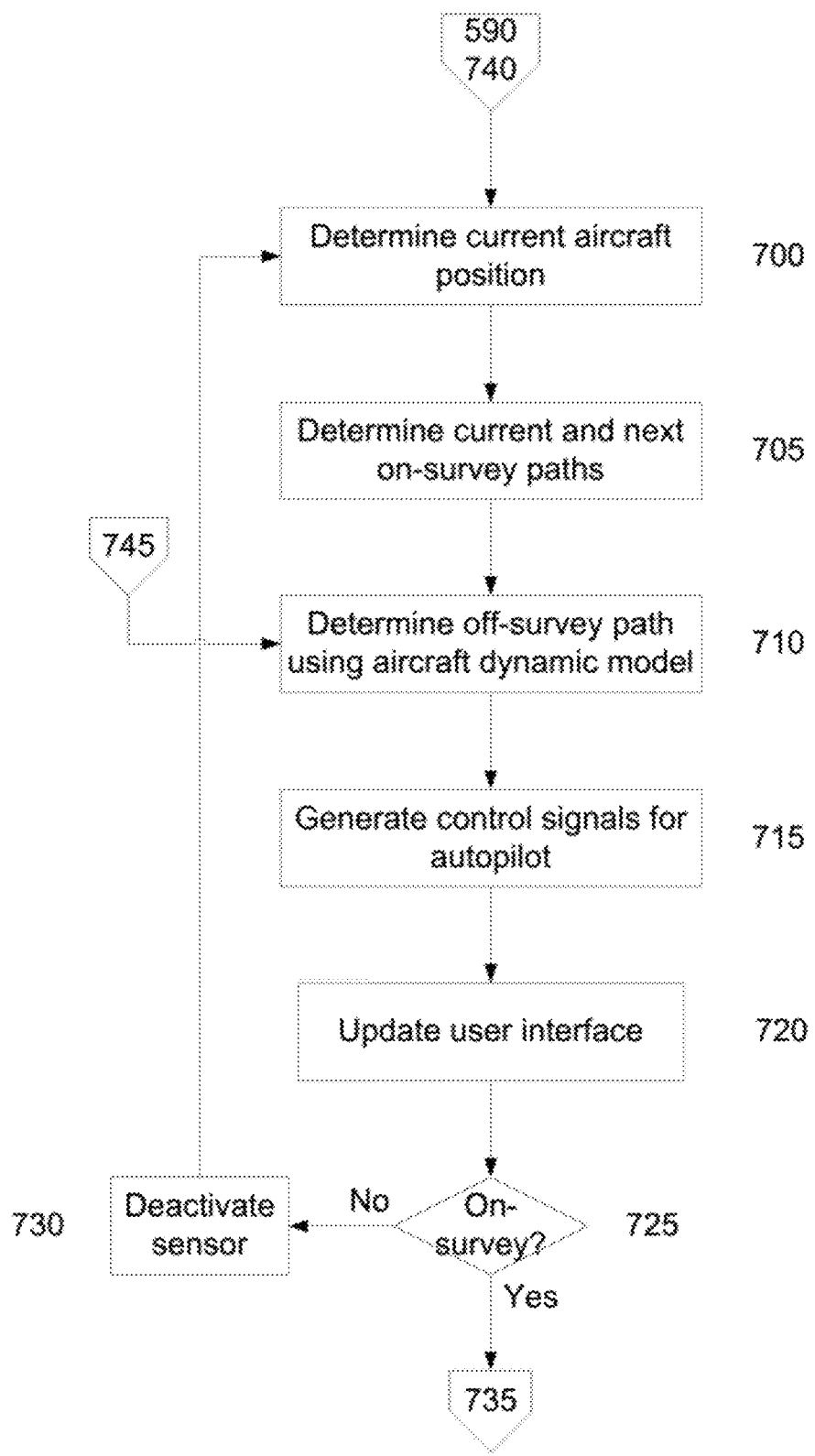
FIGS. 7A and 7B are a flowchart of an example of a method for controlling an aircraft.
Figure 7B:
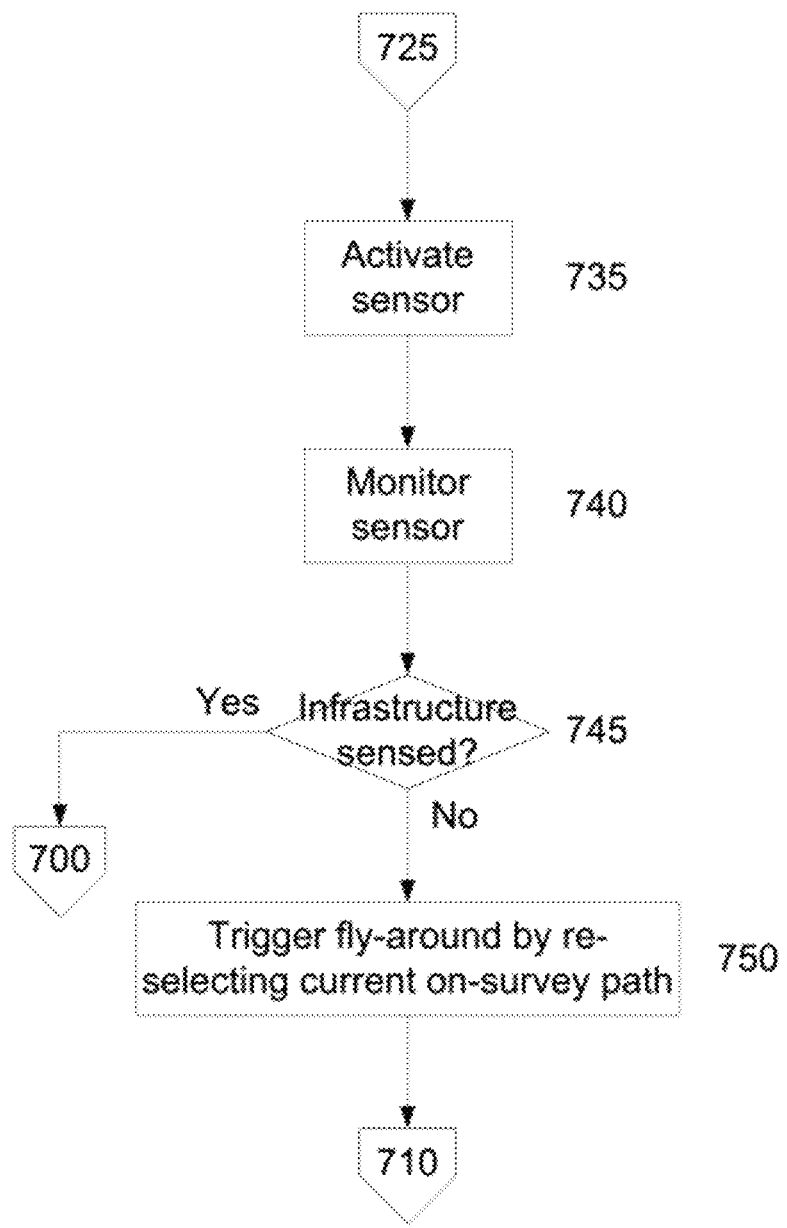

Operation of the apparatus of FIG. 6 for controlling an aircraft will now be described with reference to FIGS. 7A and 7B. For the purpose of this example, it is assumed that the aircraft processing system 601 has been provided with the path data generated at step 590 in the above described process, with this having been pre-loaded into the memory 611, or another accessible data store.

In this example, at step 700 the aircraft processing system 601 determines a current aircraft position. This information is typically obtained from on board aircraft flight sensors, such as from on inbuilt or peripheral Global Navigation Satellite System (GNSS) receivers, inertial sensors, or the like.

At step 705, the aircraft processing system 601 determines a current and next on-survey path from the path data. In particular, in aircraft processing system 601 will use the current position to identify where the aircraft is in respect of the path data, and then select the current and next on-survey paths. The aircraft processing system 601 will then calculate any off-survey path linking the current and next on-survey paths using the aircraft flight path model, at step 710. In this regard, it will be appreciated that an off-survey path may not be required in the event that the on-survey paths are directly interconnected, for example if an off-survey path having a zero length was identified in the optimisation process.

At this point the aircraft processing system 601 can optionally check whether this path results in any intersects with any terrain or no-fly zones. Whilst this should not occur as the particular sequence of on-survey segments have been selected so that flight path does not include intersects, it will be appreciated that sometimes no fly zones can be updated in real-time, for example based on weather patterns or the like. For example, in the event that a storm arises in the local area, this could be notified to the processing system 601, either manually or through automatic updates and interpreted as a no-fly zone. In the event that an intersect arises, an alarm or other notification could be used to alert the pilot, with the flight path being modified either manually by the pilot or automatically by the processing system 601, as required.

Figure 7C:
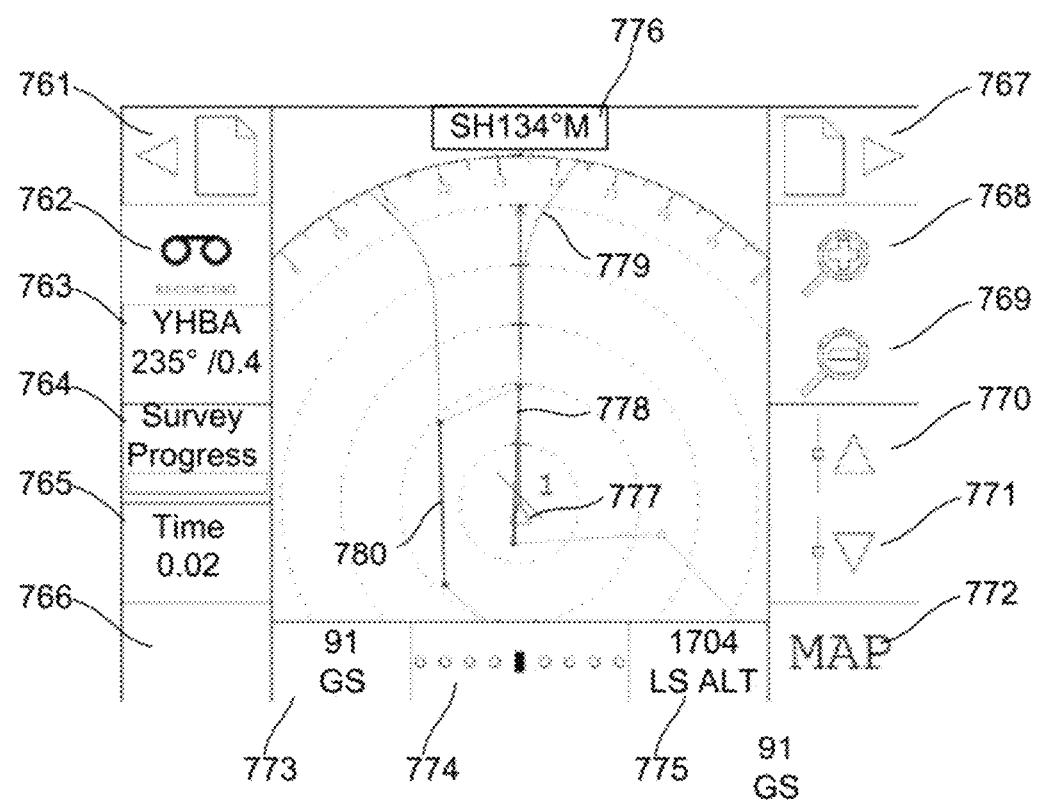
FIG. 7C is a schematic diagram of an example of a user interface.

Assuming there are no intersects, at step 715 the aircraft processing system 601 generates control signals, which are transferred to the flight control system 630. At this point the processing system may also update a user interface displayed by the display 612, an example of which is shown in FIG. 7C.

The user interface is generated to show the pilot information regarding the current flight path, including the position of on-survey segments and the off-survey flight path. This assists the pilot in ensuring that the flight path is being correctly followed by the aircraft. The user interface includes a number of indicators and controls including:

- a previous page input 761 for moving back one page;
- a system state indicator 762 to indicate whether the aircraft is transiting or recording;
- a flight indicator 763 to indicate a departure airfield and heading information;
- a survey progress indicator 764 to show the progress on the current survey;
- a time indicator 765 to indicate a current elapsed and/or remaining mission time;
- a message indicator 766 to display pilot messages and alerts;
- a next page input 767 to allow a next page to be selected;
- a map zoom in button 768;
- a map zoom out button 769;
- a select next waypoint input 770 to show the next un-surveyed on-survey path;
- a select previous waypoint input 771 to show the previous un-surveyed on-survey path;
- a map overview input 772 to view an active flight plan for summary purposes;
- a ground speed indicator 773;
- a cross track error indicator 774 to display an error between the current track and planned track;
- an sensor height above ground (AGL) estimate 775;
- a magnetic heading 776;
- an aircraft current position indicator 777 which displays the current GPS (Global Positioning System) position of the aircraft; and
- a current on-survey path indicator 778;
- an off-survey path indicator 779; and,
- a next on-survey path indicator 780.

The display can also include range rings to assist situational awareness as well as other pertinent information, as will be appreciated by persons skilled in the art.

At step 725, the aircraft processing system 601 ascertains whether the aircraft is currently or will soon be flying over on-survey segment. If not, the processing system 601 ensures the sensor is deactivated at step 730, returning to step 700 to determine a current aircraft position and repeat the above described process. If the processing system 601 determines the aircraft is on an on-survey segment, then at step 735 the aircraft processing system 601 ensures the sensor 620 is active so the infrastructure is sensed.

Thus, it will be appreciated that the above steps leave the sensor activated whilst the aircraft is on an on-survey path, deactivating the sensor as the aircraft leaves the on-survey and enters the off-survey path and reactivating the sensor when the aircraft returns to an on-survey path, thereby ensuring that sensing is only performed as required.

When on an on-survey path, at step 740 the aircraft processing system 601 will perform monitoring confirm whether infrastructure is being sensed at step 745. This can be achieved by monitoring the sensor and using recognition algorithms to ensure infrastructure can be identified in any sensed data. Alternatively this can be achieved by performing a geometrical check based on the current aircraft position, roll, pitch, and yaw, combined with knowledge of the field of view of the sensor, and known position of the infrastructure. If a positive indication is determined, the aircraft processing system 601 returns to step 700 allowing a current aircraft position to be monitored and the process repeated. If not however, the aircraft processing system 601 can trigger a go-around by reselecting current on-survey path as the next on-survey path returning then to step 710 to determine an off-survey path interconnecting to the current on-survey path to trigger a go-around.

Accordingly, in the above described process the aircraft processing system 601 uses path data generated by the processing system 201 to generate off-survey paths, which are in turn used to control the aircraft by generating suitable control signals for the flight control system. In one example, this can be achieved by having the aircraft processing system 601 implement at least a survey path planning module similar to that described above. More typically however, the aircraft processing system further implements a survey optimiser module as well, allowing the flight path to be dynamically updated as required, for example to allow for go-arounds as well as to accommodate no-fly zone changes. It will be appreciated from this that the aircraft processing system 201 could also operate to plan flight paths based on received coordinate and elevation data, in which case separate ground based planning is not required.

Nevertheless separate ground based planning can be desirable for a number of reasons. For example, this can be used to define missions for implementation by different aircraft, ensuring the missions defined are appropriate and properly allocated to different aircraft. This can also allow for submission of flight plans in advance of flights occurring, as well as allowing a reduced computational load to be used during flight.

In any event, it will be appreciated that the above described method and apparatus allow for planning of infrastructure survey flights that take into account elevation data, thereby allowing aircraft altitude to be controlled, which in turn reduces demands on the pilot. The process further uses optimisation of both on and off survey paths, improving the optimisation process, and providing flight path solutions that could not have been obtained using previous optimisation techniques. For example, this could allow for flying perpendicularly relative to the infrastructure as part of an on-survey path, which is a flight plan that would not be accommodated in existing systems. This can be useful in a variety of situations, for example, if there are infrastructure segments arranged in parallel, to avoid intersects with terrain/no-fly zones, and/or to result in shorter flight paths.

Figure 8:
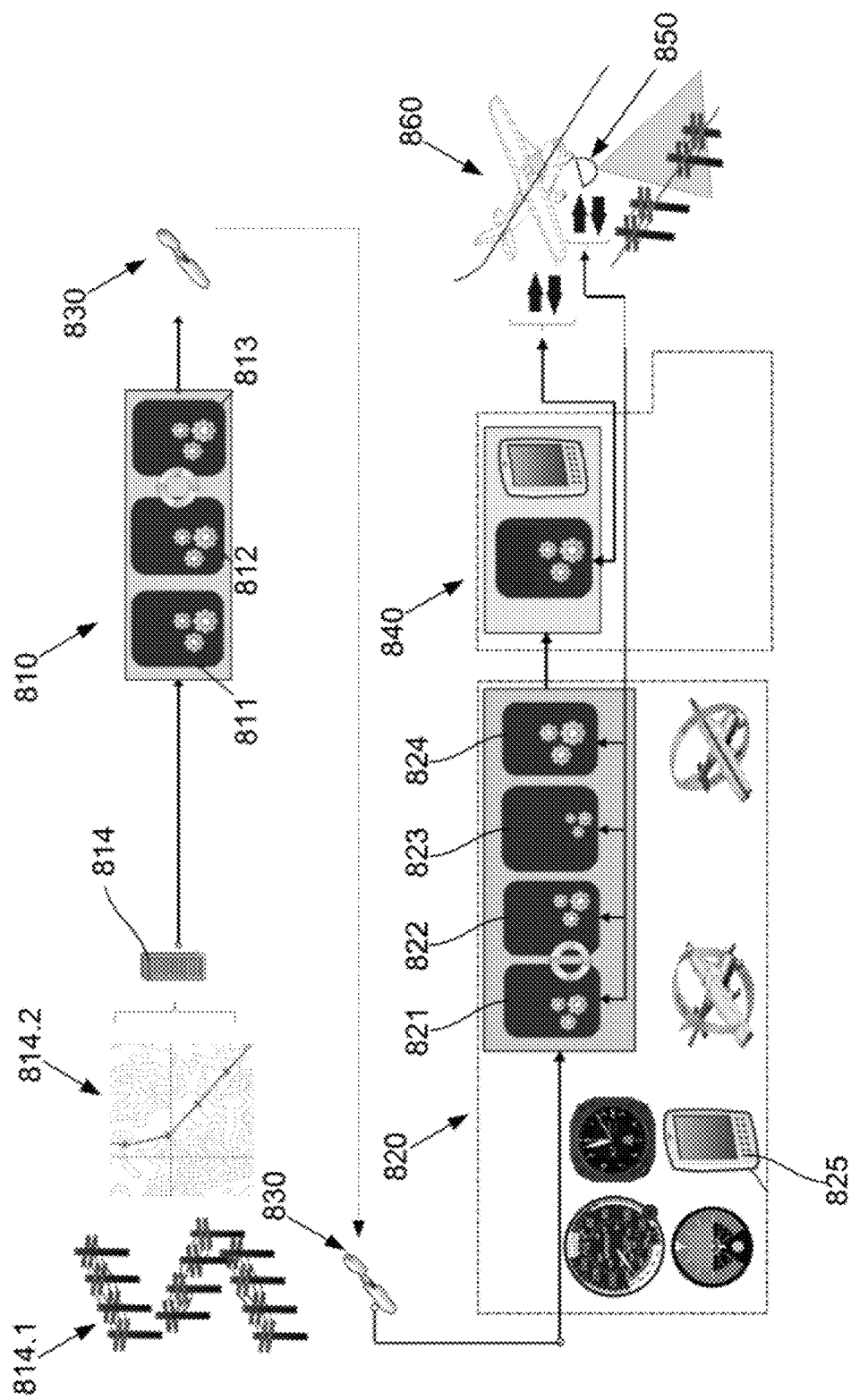
FIG. 8 is a schematic diagram of the functionality of a system for developing and flying a flight path for infrastructure surveying.

A specific example of a 3D Linear Infrastructure Pilot Flight Assist System (3D PFAS) will now be described in more detail with reference to FIG. 8.

In this example, the system includes two major components, namely the ground based planning system 810 and an onboard flight control system 820. The ground based planning system 810 includes a processing system, such as a suitably programmed computer system including a mission planning module 811, an on-off survey optimiser 812 and an on-off survey path planner 813. These modules operate to plan the flight paths and generate flight path data, which can be transferred for example using a removable storage media 830, to the onboard flight control system 820. The onboard flight control system 820 is typically a processing system, such as a computer system that implements a real-time on-survey path selector 821, a real time off-survey path planner 822, a real time survey planning, sensor control and capture quality assurance module 823, and a control guidance module 824. The onboard flight control system 820 interfaces with a commercial autopilot system 840 and sensor 850, to control flight of the aircraft 860 and sensor operation.

Each of the modules will now be described in more detail. For the purpose of illustration reference will be made to previous 2D flight planning techniques, with distinctions and benefits being highlighted as appropriate. In this regard, improvements over existing 2D system that are highlighted include automated on and off-survey path planning, automated 3D path planning, automated 3D guidance including position, roll, pitch, yaw, altitude, speed and sensor control, and in-flight replanning. It will be appreciated however that each of these are not essential.

The mission planner 811 retrieves data from a database 814 including linear segments (represented by spatial coordinates) describing linear features of the infrastructure 814.1 to be inspected, and uses an iterative bin-packing and sorting process to group into a set of user-defined time long inspection plans. This process operates on linear segments describing features to be inspected, as opposed to using manual techniques as occurs in traditional, including 2D, approaches.

In the 2D approaches the path planning approach is to treat the problem as a combinatorial optimization problem and solve by using a route sequencer. The underlying scientific methodology of the 2D PFAS approach is to manually define a set of on-survey paths by considering the linear inspection objectives to be met (and sensor footprint coverage constraints), formulate as a combinatorial optimization problem and employ an automated route sequencing approach, which results in an optimized sequence of on-survey paths with calculated off-survey paths in between forming a global flight path.

In contrast, the on-off survey optimizer 812 formulates the task as a continuous optimization problem, and uses a model of the sensor footprint to allow the algorithm to define a path consisting of straight line segments defining on-survey paths and off-survey paths, which are calculated by an aircraft flight path model, using sensor coverage requirements as constraints on the global path.

Unlike the 2D approach, the 3D PFAS approach can provide fully automated path planning and requires no manual input or assistance in defining on-survey paths which achieve coverage of the linear inspection objectives. Such an approach will work in 2D, 3D or higher space. However higher planning dimensions introduces increased computational workload which may only be achieved by high performance computing systems.

In this example, the on-off survey optimiser uses artificial intelligence techniques with an aircraft flight path model and sensor footprint model to determine the best global path which minimizes flight distance whilst achieving coverage of inspection objectives. Such AI techniques can include EA (Evolutionary Algorithm) processes (e.g. micro-GA (Genetic Algorithm)), which mimic biological evolutionary processes, or firefly optimization which mimics the way in which firefly insect swarms attract to and locate a light source. Such continuous optimizers operate by defining an individual yet cooperative agent (gene, firefly, or otherwise), with a pool or population set of such agents constituting candidate on-survey path solution sets. In one example, each agent describes a set of N on-survey paths, with each agent including information about how many on-survey paths there are (N), and the locations of these paths. Each agent can describe a different number of on-survey paths, as well as different lengths, positions, and orientations.

The next step is to evaluate the off-survey paths for this given set of candidate on-survey paths using the aircraft flight path model, and the coverage of linear tasks using the electro-optical sensor footprint model. The coverage constraints include the requirement that the sensor field of view must overlay every part of the linear infrastructure to be inspected within a user-defined coverage tolerance (e.g. 99.9%). The optimizer then continually evaluates costs and constraints, utilizing the AI search technique employed, and stops when either a predefined number of iterations or defined tolerance is reached. The defined tolerance could be of any suitable form and could be based on a difference between previous best and current worst solutions, a defined rate of change of the scores, or the like. The output of this process is a complete on-survey and off-survey path which achieves inspection of the linear infrastructure within defined coverage tolerance.

Thus, the on-off survey path planner 813 plans paths for each set of agents defined by the optimiser, allowing the optimiser to evaluate the planned paths and iteratively improve the agent combinations. In 2D systems only off-survey planning and route sequencing is performed because on-survey paths are determined by manual process. In the current system however, the on-off survey path planner determines both on-survey and off-survey paths as part of the on-off survey optimizer process.

Within a framework of AI continuous optimization—on-survey paths are defined as the linear links between autonomous biological agents. Off-survey paths are the aircraft dynamic links between on-survey paths in the pool or population of agents. An example implementation of off-survey path planning is as follows: The off-survey path planner takes an individual set of agents, which includes a set of N on-survey segments, and for every possible combination of on-survey segments and their reverse direction (on-survey segments are bi-directional), calculates the length of the off-survey path using geometric 3D path planning techniques, with consideration of aircraft heading rate constraint and speed, which describes the aircraft maximum bank angle, and minimum turn radius (or path curvature) constraint, required altitude above terrain and linear features, flight path angle and rate of climb speed of the aircraft. It also calculates potential path collisions of on-survey or off-survey paths with terrain or no-fly regions using digital elevation model and/or no-fly region specification. The complete global path is simply the set of on-survey paths with linking off-survey paths.

In one example, the techniques for 3D path generation can be based upon Kok, Jonathan, Bruggemann, Troy S., & Gonzalez, Luis F. (2013) "An evolutionary computation approach to three-dimensional path planning for unmanned aerial vehicles with tactical and kinematic constraints", in proceedings of the 15th Australian International Aerospace Congress, Melbourne Convention Centre, Melbourne, VIC, but with the techniques extended beyond off-survey path planning only to include both on and off-survey paths.

The real-time on-survey path selector 821 takes the path data of on-survey segments and the optimized sequence of on-survey segments (tour), and loads into the flight computer via USB (or other suitable mechanism such as an over-the-air mobile data connection). In this regard, only loading the on-survey segments into the flight computer can be used to save data storage (corresponding to the planned inspection activity that might occur during next flight).

The current position of the aircraft is known at frequent intervals from the commercial navigation system. Starting from the first on-survey segment of the path sequence list, the current and the next on-survey path is selected from the list.

The real-time off-survey path planner 822 plans 3D off-survey paths in real-time for control system guidance purposes. In this example, the same off-survey path planning algorithm implemented by the on-off survey path planner 813 is used, although different algorithms could be used. In this example however, the off-survey paths are calculated with respect to current position of the aircraft (in real-time), whereas the on-off survey path planner 813 operates based upon the expected position of the aircraft (at the ends of on-survey paths).

During off-survey stages of an inspection flight, the current location of the aircraft is used to calculate in real-time the optimized off-survey path between current location and next on-survey segment. This off-survey path is re-calculated at each time instant to find optimized path to next stage of inspection. Continual re-calculated of the optimize off-survey path allows the aircraft system to effectively and efficiently compensate for unexpected deviations from planned trajectories (such as might be caused of extreme wind gusts). The currently calculated version of the planned off-survey path is stored as a sequence of spatial coordinates within the flight computer, and also displayed on a flight display.

The real-time survey planning, sensor control and capture quality assurance module 824 operates to automatically control the sensor, including on-off data capture control by sending commands to the LiDAR camera system to activate or deactivate the logging of data depending on whether the aircraft is in the on-survey or off-survey mode. This automatic control of the data capture reduces the burden on the pilot and can completely obviate the need for a second operator in the aircraft to manually control the LiDAR and camera sensor as occurs in traditional techniques.

Additionally, the module provides for automatic quality assurance monitoring of data capture swath for compliance with target capture region. This element uses real time LiDAR information with positioning and orientation data from the GPS and IMU (Inertial Measurement Unit) outputs from the sensor system to calculate whether the desired area of interest has been captured within the LiDAR sensor swath. The module can also use this to perform automatic triggering of a re-survey condition if the desired capture region has fallen outside of the LiDAR sensor swath by automatically triggering a flight "go-around" condition, which commands the aircraft to re-fly that particular on-survey path segment. The on-off survey logic uses the current position of the aircraft (as known from the commercial navigation system) to determines whether it is on an on-survey path or an off-survey path and selects the planned path from either the real-time on-survey paths selector 821 or the real-time off-survey path planner 822, for command into the control guidance module 824.

The control guidance module 824 achieves tracking of the planned path, with horizontal and vertical dynamics of the aircraft being considered separately.

For horizontal guidance a fictitious receding virtual waypoint (RVWP) is placed on the planned path at a pre-designed fixed distance and moves ahead of and with the aircraft position. This is similar to the approach in Bruggemann, Troy S., Ford, Jason J., & Walker, Rodney A. (2010) "Control of aircraft for inspection of linear infrastructure". IEEE Transactions on Control Systems Technology, 19(6), pp. 1397-1409.

In the horizontal guidance approach, based upon the current position of the RVWP and the aircraft, the guidance module uses a guidance algorithm to determine the roll angle which minimizes the cross-track error to the path such that precise tracking of the path is achieved. A command (in the form of either roll angle, heading angle, or heading angle-rate) is then sent to the autopilot which executes the command through movement of control surfaces via actuator (aileron) resulting in aircraft rolling motion. If the aircraft moves over the end of the current segment, the current segment is flagged as inspected, and the current and next segments are updated by stepping to the next on-survey segments listed in the sequence list. This process is repeated, until all segments in the sequence list are inspected. After the tour is inspected, the mission is defined to be complete.

A number of other functions can also be implemented, including checking for inspection compliance by considering sensor field of view when flying in on-survey mode. In this instance, a modelled sensor field of view is utilized to check for inspection compliance. If the inspection feature lies outside of the modelled sensor field of view, a go-around manoeuvre is triggered and a real-time off-survey path is calculated from the last inspected on-survey segment.

The control guidance module 824 can also ensure inspection compliance in advance of flying across on-survey corners by examining if the on-survey path changes direction (such as the case when line segments are joined) and this heading change is larger than a certain limit, in which case a turn around the corner manoeuvre can be planned through modification of the flight path that ensures the corner between on-survey segments are within the modelled sensor field of view.

Additionally the control guidance module 824 provides for vertical guidance by providing vertical guidance commands for throttle and/or elevator actuator settings to achieve desired altitude and speed settings. In one example, this involves back-stepping elevator control with feed-forward throttle techniques or other similar elevator and throttle control techniques, as described for example in Onvaree Techakesari, Troy Bruggemann and Jason J. Ford, "Vertical channel guidance for infrastructure inspection", Proc of AUCC-2013, November, 2013.

The onboard flight control system 820 can also include a display 825. The display includes basic information provided in previous 2D systems, as well as the necessary vertical path, altitude, speed and pitch information. The display 825 typically shows inspection progress, sensor operating mode, aircraft flight mode, planned 3D trajectory and current aircraft location, with desired and current speed, pitch and altitude. The display can be used to allow the pilot to select a flight plan to activate, pause a current flight plan, etc.

The onboard flight control system 820 interfaces with a commercial 3D autopilot system 840 which accepts heading, roll, or heading rate, pitch and throttle or speed commands.

In the above described system, the functionality is separated between the ground based planning system 810 and an onboard flight control system 820, with data being transferred manually therebetween. However, this is not essential and alternative arrangements could be used.

For example, data could be transferred automatically between the ground based planning system 810 and an onboard flight control system 820. This could be achieved using a communications network, or the like, with transfer being upload (push) from the ground based planning system or download initiated from the aircraft (pull).

The ground based planning system 810 and an onboard flight control system 820 could be integrated into a single onboard system to enable on-board path planning and direct integration with the in-flight/real-time computer and sensor control system to enable the direct generation and rerouting of revised new flight paths for pilot initiated events and/or in circumstances such as no fly regions, severe weather events, air traffic, unplanned infrastructure capture or other situation requiring a change to the planned mission. Such an event may be triggered via external sensory means or by pilot intervention.

Furthermore, whilst the above described system is used to generate control signals for a flight control system, such as an autopilot, this is not essential, and alternatively the system could be integrated into an autopilot, thereby providing an integrated 'all in one' package and eliminate physically separate interconnected components.

Whilst the above described arrangements have focused on implementation in pilot controlled systems, this is also not essential, and alternatively, the systems could be implemented in Unmanned Aerial Vehicles (UAVs), remotely monitored and piloted aerial vehicles and/or drones.

The system may also utilise positioning and related inertial measurement parameters provided to the aircraft remotely through communication networks or other data transmission or other means.

Additionally, the sensor could be of any form and reference to LiDAR as one example is not intended to be limiting.

In any event, it will be appreciated that the above described systems provide mechanisms that allow for flight planning and control of aircraft that can address deficiencies of existing systems.

For example, the process can addresses the limitations of previous systems through the use of iterative processes, for example using biologically modelled optimisation methods, including combinatorial techniques, to determine an optimized 3D flight path with consideration of aircraft dynamic constraints in 3D, spatial and orientation sensor field of view constraints and terrain/no-fly regions.

In previous systems, once a flight path had been developed, the pilot had to attempt to fly the desired path whilst simultaneously maintaining aircraft pitch (altitude), air speed and otherwise monitor aircraft surrounds at low altitude (sub 2000 m), which in placed a high and demanding load on the pilot and consequently was only practicable for short periods of duration. Additionally, the ability of the pilot to control the aircraft and consistently achieve the target path is highly variable and subject to pilot experience and other human factors such as fatigue. Limitations in existing commercial autopilot systems also fails to consider tracking of a path for linear infrastructure inspection, designed with sensor field of view constraints and aircraft dynamics, being designed primarily for waypoint to waypoint navigation, take-off-, holding pattern, or landing tasks.

In contrast, the above described examples can provide control for flight guidance, including position, roll, pitch, yaw, altitude and speed, as well as LiDAR/Imaging Sensor or deployment control, by interfacing with existing commercial auto pilot systems. This assists the pilot by controlling the banking of the aircraft to make the necessary turns and climbs as required to follow the desired flight path, in addition to controlling altitude and speed to achieve the required height and speed above the infrastructure for safety and successful data capture, whilst avoiding terrain or no-fly zones. This allows the pilots to fly along a carefully planned trajectory, whilst reducing the pilot workload requirements to control the airspeed and altitude and achieve inspection objectives in the presence of terrain or no-fly zones, and removes the variability of data capture process.

In one example, the process can provide automated on and off-survey path planning, automated 3D path planning, automated 3D guidance and in-flight replanning capabilities.

Automated holistic on and off-survey path planning can streamline the process efficiencies and remove the necessity for manual input. This can lead to improvements in dynamic flexibility in the flight planning processes (on-survey paths can easily be modified to accommodate terrain or no-fly zone considerations), and the possibility for shorter flight paths by planning both on and off-survey paths simultaneously, for example by allowing paths that do not follow infrastructure directly, but allow for lateral flying relative to infrastructure, which is useful for example when sensing junctions between network spurs, or parallel spaced apart infrastructure segments.

Automated 3D path planning reduces operator/pilot workload and brings more efficient planning, efficient data capture and improved safety. This is performed by providing an automated 3D path planning capability by automating the process of finding the shortest flight path which achieves linear inspection objectives, whilst considering aircraft dynamic (turn and climb) constraints, inspection sensor operating parameters (required operating speeds, altitudes and 3D orientation), 3D terrain and no-fly zone environment.

Providing an automated 3D flight guidance capability by automated turn, speed and altitude control reduces pilot in-flight workload, ensures efficiency of data capture, and safety is improved by autonomously guiding around terrain and no-fly regions.

Providing the ability to replan existing flight paths in 3D, such as required, for example, if a severe weather pattern covers part of the linear inspection task region, and on-survey and off-survey path planning reconfiguration is required (such as reorientate, shorten/lengthen, realign, add or remove on-survey paths, and update the associated impacts on the planned off-survey paths).

Thus, the above described processes can provide algorithms for automatically generating 3D flight paths for an aircraft that achieves a desired inspection purpose (sensing of nearly linear infrastructure), whilst also ensuring safe flight. Given infrastructure data, the system can automatically design both on-survey and off-survey flight trajectories under consideration a range of design considerations, including avoidance of non-flyable flight areas such as coast regions, natural terrain barriers, and any prohibited flight areas; feasibility of flight path from aerodynamic perspective, limitations of available flight control systems, whilst ensuring efficient inspection time.

As a result, the above described methods and apparatus can provide greater performance and improved operational efficiencies compared to traditional techniques, including reduced manual intervention in the path planning process, optimisation of path planning techniques resulting in reduced flight paths, reduced pilot workload through increased levels of autonomy and control of altitude and aircraft speed via developed system, an ability for the system to automatically alter and recalculate flight paths 'on-aircraft' in response to changing capture conditions, resulting in better network capture and reduced need to otherwise plan and re-fly network, the ability to generate and fly 3D flight plans, making the system more suitable to undulating terrain and expanding geographic/market areas for utilisation of the technology.

Throughout this specification and claims which follow, unless the context requires otherwise, the word "comprise", and variations such as "comprises" or "comprising", will be understood to imply the inclusion of a stated integer or group of integers or steps but not the exclusion of any other integer or group of integers.

Persons skilled in the art will appreciate that numerous variations and modifications will become apparent. All such variations and modifications which become apparent to persons skilled in the art, should be considered to fall within the spirit and scope that the invention broadly appearing before described.

The claims defining the invention are as follows:

1. A method of developing a flight path for precision flying over an area of interest, the method including, in an electronic processing device:
    a) determining coordinate and elevation data relating to an area of interest;
    b) using the coordinate and elevation data to determine a flight path including:
        i) precision paths corresponding to precision flying trajectories; and,
        ii) non-precision paths interconnecting at least some of the precision paths, wherein the method includes:
            (1) iteratively determining a plurality of best candidate flight paths by:
                (a) determining a plurality of candidate precision path sets;
                (b) for each candidate precision path set, determining a candidate flight path; and,
                (c) selecting a best candidate flight path from the candidate flight paths;
            (2) selecting one of the plurality of best candidate flight paths as a best flight path; and,
    c) generating path data at least partially indicative of the best flight path, the path data being useable in generating control signals for at least partially controlling operation of the aircraft, in use.

2. A method according to claim 1, wherein the precision paths are for at least one of:
    a) sensing at least part of the area of interest; and,
    b) deployment into the area of interest.

3. A method according to claim 1, wherein the method includes, in the electronic processing device, determining the flight path at least in part using an aircraft flight path model and at least one of sensor coverage and deployment parameters.

4. A method according to claim 1, wherein the method includes, in the electronic processing device, for each candidate precision path set:
    a) determining non-precision paths between pairs of precision paths using an aircraft flight path model;
    b) for each possible sequence of precision paths, calculating a length of a possible flight path; and,
    c) selecting the possible flight path with the shortest flight path length as the candidate flight path.

5. A method according to claim 4, wherein the method includes, in the electronic processing device, using the aircraft flight path model to calculate a candidate non-precision path using at least one of:
    a) aircraft heading rate constraint and speed;
    b) an aircraft maximum bank angle;
    c) an aircraft minimum turn radius;
    d) a required minimum altitude above the area of interest;

e) flight path angle; and f) rate of climb speed of the aircraft.

6. A method according to claim 5, wherein the method includes, in the electronic processing device:
 a) determining a score for each candidate flight path in accordance with at least one of:
  i) intersections with terrain using the elevation data;
  ii) intersections with no-fly zones using no-fly zone data indicative of the no-fly zones;
  iii) at least one of sensor coverage and deployment parameters; and,
  iv) a flight path length; and,
 b) selecting the best candidate flight path using the score.

7. A method according to claim 1, wherein the method includes, in the electronic processing device, at least one of:
 a) modifying the candidate precision path sets for each iteration;
 b) for each iteration:
  i) comparing a best candidate flight path to a current best flight path; and,
  ii) selectively updating the current best flight path with the best candidate flight path depending on the results of the comparison; and,
 c) iteratively determining best candidate flight paths until at least one of:
  i) a defined number of iterations have been performed; and,
  ii) a defined tolerance is reached.

8. A method according to claim 1, wherein the path data includes:
 a) precision segment data indicative of precision paths; and,
 b) an precision path sequence indicative of an order in which precision paths should be flown.

9. A method according to claim 1, wherein the path data is used in controlling at least one of:
 a) a pitch and altitude of the aircraft in use;
 b) at least one of a roll, yaw, airspeed and engine power of the aircraft in use; and,
 c) at least one of a sensor and a deployment device.

10. A method according to claim 1, wherein the method includes, in the electronic processing device:
 a) determining a current aircraft position; and,
 b) calculating the flight path based on the current aircraft position.

11. Apparatus for developing a flight path for precision flying over an area of interest, the apparatus including an electronic processing device that:
 a) determines coordinate and elevation data relating to an area of interest;
 b) uses the coordinate and elevation data to determine a flight path including:
  i) precision paths corresponding to precision flying trajectories; and,
  ii) non-precision paths interconnecting at least some of the precision paths, wherein the method includes:
   (1) iteratively determining a plurality of best candidate flight paths by:
    (a) determining a plurality of candidate precision path sets;
    (b) for each candidate precision path set, determining a candidate flight path, and,
    (c) selecting a best candidate flight path from the candidate flight paths;
   (2) selecting one of the plurality of best candidate flight paths as a best flight path; and,
 c) generates path data at least partially indicative of the best flight path, the path data being useable in generating control signals for at least partially controlling operation of the aircraft, in use.

12. A method of developing a flight path for precision flying over an area of interest, the method including, in an electronic processing device:
 a) determining a flight path by optimising a combination of precision paths corresponding to precision flying trajectories and non-precision paths interconnecting at least some of the precision paths by:
  i) iteratively determining a plurality of best candidate flight paths by:
   (1) determining a plurality of candidate precision path sets;
   (2) for each candidate precision path set, determining a candidate flight path; and,
   (3) selecting a best candidate flight path from the candidate flight paths;
  ii) selecting one of the plurality of best candidate flight paths as a best flight path; and,
 b) generating path data at least partially indicative of the best flight path, the path data being useable in generating control signals for at least partially controlling operation of the aircraft, in use.

13. A method according to claim 12, wherein the method includes, in the electronic processing device:
 a) determining a plurality of candidate precision path sets;
 b) for each candidate precision path set, determining a candidate flight path; and,
 c) selecting a best candidate flight path from the candidate flight paths.

14. A method according to claim 13, wherein the method includes, in the electronic processing device, for each candidate precision path set:
 a) determining non-precision paths between pairs of precision paths;
 b) for each possible sequence of precision paths, calculating a length of a possible flight path; and,
 c) selecting the possible flight path with the shortest flight path length as the candidate flight path.

15. A method according to claim 14, wherein the method includes, in the electronic processing device determining candidate non-precision paths using an aircraft flight path model by calculating a candidate non-precision path using at least one of:
 a) aircraft heading rate constraint and speed;
 b) an aircraft maximum bank angle;
 c) an aircraft minimum turn radius;
 d) a required minimum altitude above the area of interest;
 e) flight path angle; and
 f) rate of climb speed of the aircraft.

16. A method according to claim 13, wherein the method includes, in the electronic processing device:
 a) determining a score for each candidate flight path in accordance with at least one of:
  i) intersections with terrain using the elevation data;
  ii) intersections with no-fly zones using no-fly zone data indicative of the no-fly zones;
  iii) at least one of sensor coverage and deployment parameters; and,
  iv) a flight path length; and,
 b) selecting the best candidate flight path using the score.

17. A method according to claim 13, wherein the method includes, in the electronic processing device:
 a) iteratively determining a plurality of best candidate flight paths; and, b) selecting one of the plurality of best candidate flight paths as a best flight path.

18. A method according to claim 17, wherein the method includes, in the electronic processing device, at least one of:
   a) modifying the candidate precision path sets for each iteration;
   b) for each iteration:
      i) comparing a best candidate flight path to a current best flight path; and,
      ii) selectively updating the current best flight path with the best candidate flight path depending on the results of the comparison; and,
   c) iteratively determining best candidate flight paths until at least one of:
      i) a defined number of iterations have been performed; and,
      ii) a defined tolerance is reached.

19. Apparatus for developing a flight path for precision flying over an area of interest, the apparatus including an electronic processing device that:
   a) determines a flight path by optimising a combination of precision paths corresponding to precision flying trajectories and non-precision paths interconnecting at least some of the precision paths by:
      i) iteratively determining a plurality of best candidate flight paths by:
         (1) determining a plurality of candidate precision path sets,
         (2) for each candidate precision path set, determining a candidate flight path; and,
         (3) selecting a best candidate flight path from the candidate flight paths;
      ii) selecting one of the plurality of best candidate flight paths as a best flight path; and,
   b) generates path data at least partially indicative of the best flight path, the path data being useable in generating control signals for at least partially controlling operation of the aircraft, in use.

* * * * *